(12) United States Patent
Naganuma et al.

(10) Patent No.: US 10,943,384 B2
(45) Date of Patent: Mar. 9, 2021

(54) UTILIZING SMOOTH SHADING PATCHES IN IMAGE RENDERING

(71) Applicant: KYOCERA Document Solutions Inc., Osaka (JP)

(72) Inventors: Yuzuru Naganuma, Torrance, CA (US); Dongpei Su, Palos Verdes Estates, CA (US); Sheng Li, El Segundo, CA (US); Kendrick Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 44 days.

(21) Appl. No.: 16/215,589

(22) Filed: Dec. 10, 2018

(65) Prior Publication Data
US 2020/0184704 A1 Jun. 11, 2020

(51) Int. Cl.
*G06T 15/04* (2011.01)
(52) U.S. Cl.
CPC .................................. *G06T 15/04* (2013.01)
(58) Field of Classification Search
CPC ......... G06T 15/04; G06T 7/337; G06F 17/11; G06F 7/483; G06F 7/556; G06F 2101/10
See application file for complete search history.

(56) References Cited

U.S. PATENT DOCUMENTS

| 5,271,861 A | 12/1993 | Buchwald et al. |
| 5,313,840 A | 5/1994 | Chen et al. |
| 8,442,314 B2 | 5/2013 | Kitago |
| 9,508,316 B2 | 11/2016 | Liu et al. |

OTHER PUBLICATIONS

Adobe Systems Incorporated, PDF Reference, 6th Edition, Adobe Portable Document Format, Version 1.7, Nov. 2006, Chapter 4.6.3, pp. 302-331, with additional title page and plate (39 pages total).
Kaspar Fischer, Piecewise Linear Approximation of Bezier Curves, Oct. 16, 2000.

*Primary Examiner* — Antonio A Caschera
(74) *Attorney, Agent, or Firm* — GrowIP Law Group LLC

(57) ABSTRACT

Example systems and related methods relate to rendering using smooth shading. A computing device can receive information about an image, the information including one or more patches, where a particular patch of the one or more patches is specified using a plurality of non-linear equations. The computing device can determine one or more linear approximations to a particular non-linear equation of the plurality of non-linear equations. The computing device can update the particular patch to replace the particular non-linear equation with at least one linear approximation of the one or more linear approximations. The computing device can render at least part of the image by at least rendering the updated particular patch. The computing device can generate an output that includes the rendered at least part of the image.

18 Claims, 14 Drawing Sheets

210 Receive specification S of an object O to be at least partially rendered, S having four-cornered smooth shading patches (4CSSPs) P1 ... Pn, n > 0

220 Determine shape list SL of shapes representing patches P1 ... Pn and corresponding color list CL of colors at patch corners

230 Calculate pixel colors for a grid of pixels PIX shapes in shape list SL using linear and/or bi-linear interpolation of colors in color list CL

240 Generate output that includes at least part of grid PIX

FIG. 2A

UTILIZING SMOOTH SHADING PATCHES IN IMAGE RENDERING

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can use various types of colorant to print on paper or other media. These types of colorant can include toner, inks, and dyes. These colorants can be of various colors; e.g., black, cyan, magenta, yellow. Typically, colorant for a printing device can be replaced or refilled. For example, toner of one or more colors can be replaced in many modern laser printers.

SUMMARY

In a first aspect, a method is provided. A computing device receives information about an image. The information includes one or more patches, where a particular patch of the one or more patches is specified using a plurality of non-linear equations. The computing device determines one or more linear approximations to a particular non-linear equation of the plurality of non-linear equations. The computing device updates the particular patch to replace the particular non-linear equation with at least one linear approximation of the one or more linear approximations. The computing device renders at least part of the image by at least rendering the updated particular patch. The computing device generates an output that includes the rendered at least part of the image.

In a second aspect, a computing device is provided. The graphics computing device includes one or more processors; and non-transitory data storage configured to store computer-readable instructions that, when executed by the one or more processors, cause the computing device to perform tasks. The tasks include: receiving information about an image, the information including one or more patches, where a particular patch of the one or more patches is specified using a plurality of non-linear equations; determining one or more linear approximations to a particular non-linear equation of the plurality of non-linear equations; updating the particular patch to replace the particular non-linear equation with at least one linear approximation of the one or more linear approximations; rendering at least part of the image by at least rendering the updated particular patch; and generating an output that includes the rendered at least part of the image.

In a third aspect, an article of manufacture is provided. The article of manufacture includes a non-transitory data storage storing at least computer-readable instructions. The computer-readable instructions, when executed by one or more processors of a computing device, cause the computing device to perform tasks. The tasks include: receiving information about an image, the information including one or more patches, where a particular patch of the one or more patches is specified using a plurality of non-linear equations; determining one or more linear approximations to a particular non-linear equation of the plurality of non-linear equations; updating the particular patch to replace the particular non-linear equation with at least one linear approximation of the one or more linear approximations; rendering at least part of the image by at least rendering the updated particular patch; and generating an output that includes the rendered at least part of the image.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 2A is a flowchart of a method for using patches in rendering objects, according to an example embodiment.

DETAILED DESCRIPTION

Figure 1:
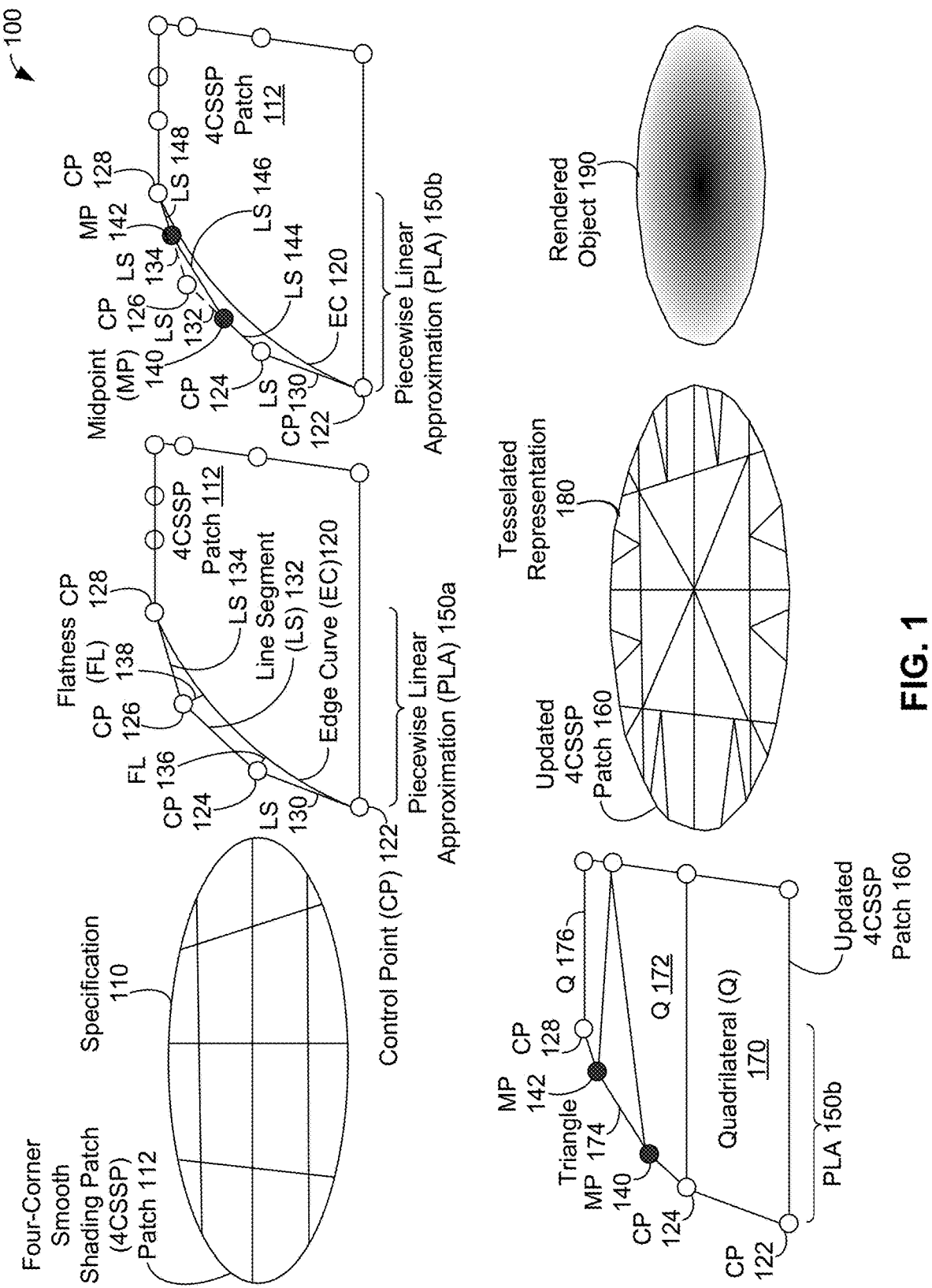
FIG. 1 illustrates a scenario for rendering an image of an object involving a computer representation of the object specified using patches and a linear approximation of one of the patches, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A computing device can render, or generate an image, of an object based on a computational model of the object. One example application of rendering objects is in computer generation of documents, including documents printed on paper or otherwise processed by printing devices. Such documents can be specified using one or more page description languages, including, but not limited to Kyocera Page Description Language (KPDL™), Printer Command Language (PCL®), Adobe® Portable Document Format (PDF), the generic Page Description Language (PDL), and PostScript®. Other page description languages are possible as well. For example, a computing device rendering objects during computer generation of documents can be and/or act as a printing device.

In some cases, the model can describe the object using "patches" or regions of one or more surfaces. The geometry of a patch can be described mathematically. For example, a page description language can specify the use of patches, including Coons and/or tensor-product patches, to model one or more objects to be rendered for a document. A Coons patch specifies four corner points of a region and four curves that connect the four corner points. The four curves can be Bezier curves, such as cubic Bezier curves suitable for modeling a variety of smooth curves. A tensor-product patch can be a generalization of a Coons patch. The tensor-product patch specifies four corner points and twelve interior points of a region and eight curves that connect the sixteen total points, where the eight curves can be Bezier curves. Both Coons patches and tensor-product patches are bounded by four Bezier curves—the additional four Bezier curves of a tensor-product patch specify interior points of a surface modeled by the patch.

A patch can be associated with one or more colors. To specify colors of a patch, the patch can be defined with respect to a pair of parametric variables, such as parametric variables u and v, which vary horizontally and vertically across a unit square. A resulting space defined by the parametric variables u and v can be termed UV space. The corners of the unit square map to corners of the patch and the sides of the unit square map to sides of the patch. Coordinates specified in terms of u and v can be mapped from the unit square to the patch. Bi-linear (or perhaps linear) interpolation can be used to fill in colors over the unit square. Then, the use of linear and/or bi-linear color interpolation can cause colors to "smoothly" or gradually change over a surface expressed by the patch—patches that use linear and/or bi-linear color interpolation can be called smooth shading or smoothly colored patches. In some cases, such as for tensor-product and Coons patches, sides of the patch are specified by Bezier curves, which may not be linear curves.

Prior object rendering techniques utilize software executing on general purpose hardware to render patches, such as smooth shading patches. However, software-only solutions utilizing general purpose hardware can be relatively slow and/or consume a large amount of memory to render patches. On the other hand, prior hardware-related techniques involving special-purpose and/or embedded hardware are generally not cost effective in implementing complex nonlinear equations, such as Bezier curves of smooth shading patches.

Therefore, a beneficially improved technique for rendering objects specified using smooth shading patches can involve a computing device utilizing software and hardware, including software and hardware for the herein-described piecewise linear approximation algorithm, the herein-described patch dividing algorithm, and herein-described hardware graphics unit, to divide some or all of the patches into one or more polygons, such as triangles, trapezoids, and/or quadrilaterals, color the polygons using linear and/or bi-linear interpolation, and render an object specified using the patches.

As part of dividing a patch into polygons, software for the piecewise linear approximation algorithm can estimate a Bezier curve of a patch using a piecewise linear approximation that includes a combination of connected line segments. Using line segments of the piecewise linear approximation rather than the Bezier curve can simplify, and thereby accelerate, the division of the patch into polygons. In particular, software for the patch dividing algorithm can utilize the piecewise linear approximations of the Bezier curves in generating polygons that divide or tessellate the path. By using these piecewise linear approximations, the patch dividing algorithm can generate fewer polygons in comparison to utilizing the Bezier curve directly, thereby beneficially saving memory and time consumed by storing and processing the polygons in comparison to prior techniques. Once the patches are divided into polygons, the computing device can use the hardware graphics unit to accelerate rendering of the polygons and thereby accelerate rendering of the object. The rendered object can then be saved, printed to paper, communicated, and/or otherwise utilized by the computing device and perhaps other computing devices.

Software of the computing device can interface with the hardware graphics unit using a shape list and a color list. As mentioned above, the computing device can divide the smooth shading patches into polygons using piecewise linear approximations of Bezier curves as mentioned above. In particular, the polygons can be fundamental graphics shapes suitable for rendering by the hardware graphics unit, and information about the fundamental graphics shapes can be stored in the shape list. The color list can store color values for each corner of each fundamental graphics shape in the shape list. The rendering software can provide the shape list and the color list to the hardware graphics unit, which can then render the shapes in the shape list using the colors in the color list. In particular, the hardware graphics unit can smoothly color each polygon in the shape list by calculating a fill color for each pixel inside a polygon using linear and/or bi-linear interpolation of the color values provided in the color list.

Using linear and/or bi-linear interpolation of the color values for smoothly shaded patches can enable the use of fewer, albeit larger, polygons than using a solid fill technique of color values. For example, each pixel of a solid-filled polygon representing a smooth shading patch may have the same color. Then, for a smooth shading patch having multiple colors, at least one solid-filled polygon is to be used per color of the patch. However, as pixels of one polygon colored using linear and/or bi-linear interpolation can have multiple colors, fewer polygons are likely to be needed to represent the colors of the smooth shading patch.

Generating polygons using piecewise linear approximations of Bezier curves can reduce the number of polygons compared with prior implementations, thereby saving memory used to store the polygons representing an object and saving rendering time when the polygons are rendered. The number of polygons can be further reduced by using linear and/or bi-linear interpolation for determining colors of pixels in the polygons instead of using solid fill techniques for determining colors of pixels. As memory and rendering time are generally dependent on a number of polygons being rendered, using linear and/or bi-linear interpolation for smoothly shaded patches can both save memory and time during rendering in comparison to using solid fill techniques. Also, the herein-described combination of flexible rendering software and an optimized hardware graphics unit reduces software workload and improves overall rendering speed and memory performance, particularly in comparison to prior techniques that are more reliant on software.

Example Smooth Shading Patch Rendering Algorithms, Hardware, and Software

FIG. 1 illustrates scenario 100 where a computing device renders an image of an object involving a computer representation of the object specified using patches and a linear approximation of one of the patches, according to an example embodiment. As an example, the computing device can be computing device 1000 discussed below in the context of FIG. 10. As shown at upper left of FIG. 1, the object being rendered in scenario 100 is an elliptical object modeled using specification 110. Specification 110 includes twelve patches including four-corner smooth shading patch (4CSSP) 112.

A four-corner smooth shading patch can be a representation of an graphical area, such as a part or all of a surface of an object, that is defined in terms of four corners. Each of the four corners of a four-corner smooth shading patch can be associated with a pair of coordinates (u, v) and/or one or more colors. Edges between corners of a four-corner smooth shading patch can be specified using cubic (or lower degree) polynomials; e.g., cubic (or lower degree) Bezier curves. Example four-corner smooth shading patches include four-corner Coons patches and four-corner tensor-product patches. Other four-corner smooth shading patches are possible as well.

At upper center of FIG. 1, four-corner smooth shading patch 112 is shown in more detail. Four-corner smooth shading patch 112 is based on several control points (CPs) shown as white circles on edges of four-corner smooth shading patch 112—these control points include control points 122, 124, 126, and 128. The control points of four-corner smooth shading patch 112 specify four curves used to provide four boundaries of four-corner smooth shading patch 112. In particular, edge curve (EC) 120 is a cubic Bezier curve specified using four control points 122, 124, 126, and 128. The other three boundaries of four-corner smooth shading patch 112 are specified as linear Bezier curves; e.g., as line segments.

The geometry of a patch, such as four-corner smooth shading patch 112, can be described mathematically. The patch is defined over a pair of parametric variables, u and v, which vary horizontally and vertically across a unit square. The surface S of a patch is defined by Equation (1) below:

$$S(u, v) = \sum_{i=0}^{3} \sum_{j=0}^{3} p_{ij} \times B_i(u) \times B_j(v) \quad (1)$$

where $p_{ij}$ is a control point for column i and row j, and $B_i$ and $B_j$ are the Bernstein polynomials shown as Equations (2.1), (2.2), (2.3), (2.4) below.

$$B_0(t) = (1-t)^3 \quad (2.1)$$

$$B_1(t) = 3t \times (1-t)^2 \quad (2.2)$$

$$B_2(t) = 3t^2 \times (1-t) \quad (2.3)$$

$$B_3(t) = t^3 \quad (2.4)$$

Since each point $p_{ij}$ is actually a pair of coordinates ($x_{ij}$, $y_{ij}$), the surface can also be expressed as Equations (3.1) and (3.2) below:

$$x(u, v) = \sum_{i=0}^{3} \sum_{j=0}^{3} x_{ij} \times B_i(u) \times B_j(v) \quad (3.1)$$

$$y(u, v) = \sum_{i=0}^{3} \sum_{j=0}^{3} y_{ij} \times B_i(u) \times B_j(v) \quad (3.2)$$

The colors of a patch can be specified by four colors which express the respective colors of each of the four corner points of the patch. Then, colors for non-corner points of the patch can be defined by linear and/or bi-linear interpolation starting with the four corner colors. Linear and/or bi-linear interpolation values for an interior point PI within a patch can be calculated in terms of u and v coordinates for point PI, where the parametric variables u and v mentioned above are used as the u and v coordinates.

In some cases, a patch can have a color per control point. That is, for a Coons patch, a color can be specified either for each of the four corner points or for each of the twelve control points of the patch. Similarly, for a tensor-product patch, a color can be specified either for each of the four corner points or for each of the sixteen control points of the patch.

The computing device can carry out a piecewise linear approximation algorithm to estimate (or approximate) a non-linear (e.g., quadratic, cubic, etc.) Bezier curve BC, such as edge curve 120, as a piecewise linear approximation. Bezier curve BC can be specified using NCP distinct control points ($CP_1$, $CP_2$ ... $CP_{NCP}$), NCP>2. Note that if NCP=1, BC is a point and if NCP=2, BC is a line segment and so is already piecewise linear. Therefore, the piecewise linear approximation algorithm assumes NCP>2.

An example of the piecewise linear approximation algorithm used to approximate edge curve 120 is shown in FIG. 1. The piecewise linear approximation algorithm can include the following four steps listed below.

1. Determine a piecewise linear approximation PLA to Bezier curve BC by determining two or more line segments connecting adjacent pairs of the NCP control points of Bezier curve BC. For example, at upper center of FIG. 1, adjacent control points 122 and 124 of edge curve 120 are shown connected by line segment (LS) 130, adjacent control points 124 and 126 of edge curve 120 are shown connected by line segment 132, and adjacent control points 126 and 128 are shown connected by line segment 134. Then, in this example, piecewise linear approximation (PLA) 150a can include control points 122, 124, 126, and 128 along with connecting line segments 130, 132, and 134.

2. Determine whether the piecewise linear approximation PLA is a close approximation to Bezier curve BC. Piecewise linear approximation PLA is a close approximation to Bezier curve BC if each point connecting two line segments of PLA {e.g., control points 124 and 126 for piecewise linear approximation 150*a*) are "flat enough". Determining whether a point P of PLA is flat enough can involve determining a flatness value for point P. One example flatness value for a point P equals an absolute value of a distance between point P and a closest point on Bezier curve BC to point P. If the flatness value for point P is less than a threshold flatness value; e.g., a predetermined value greater than zero, then point P is sufficiently close to Bezier curve BC and therefore point P is flat enough. Other flatness values for point P, such as a square of the distance between point P and a closest point on Bezier curve BC to point P, and other threshold flatness values; e.g., a predetermined value multiplied by squares of respective linear combinations of the x and y components of the control points. If the flatness value for point P is more than the threshold flatness value; then point P is not sufficiently close to Bezier curve BC and therefore point P is not flat enough.

FIG. 1 illustrates flatness values for piecewise linear approximation 150*a* as flatness (FL) 136 between edge curve 120 and control point 124 connecting line segments 130 and 132, and as flatness 138 between edge curve 120 and control point 126 connecting line segments 132 and 132. In scenario 100, control point 124 is determined to be flat enough and control point 126 is determined to be not flat enough.

3. If all points connecting two of the line segments of the piecewise linear approximation PLA are flat enough, then the computing device can determine PLA is close enough to Bezier curve BC and can output PLA. After outputting PLA, the piecewise linear approximation algorithm can be terminated.

4. At this point of the piecewise linear approximation algorithm, at least one point that connects two line segments of the piecewise linear approximation is not flat enough, otherwise the algorithm would have terminated at step 3. Then, for each point P that connects two line segments of the piecewise linear approximation and is not flat enough, let P connect two line segments L1 and L2. The computing device can determine midpoints M1 and M2 for respective line segments L1 and L2 between P and the other endpoint of respective line segments L1 and L2. Then, update PLA by (1) replacing both a portion of line segment L1 between M1 and P and a portion of line segment L2 between P and M2 with a new line segment L3 connecting M1 and M2 and (2) removing point P from PLA. After updating PLA, return to step 2; i.e., to determine whether at least new points M1 and M2 of PLA are flat enough.

For scenario 100, as shown at upper right of FIG. 1, determined midpoint (MP) 140 is a midpoint of line segment 132 between control point 124 and not-flat-enough control point 126 and midpoint 142 is determined as a midpoint of line segment 134 between not-flat-enough control point 126 and control point 128. For the example shown at upper right of FIG. 1, piecewise linear approximation 150*a* is updated to form piecewise linear approximation 150*b*, where piecewise linear approximation 150*b* includes: control point 122, line segment 130, control point 124, line segment 144 (which is the portion of line segment 132 between control point 124 and midpoint 140), midpoint 140, line segment 146 connecting midpoints 140 and 142, midpoint 142, line segment 148 (which is the portion of line segment 134 between midpoint 142 and control point 128) and control point 128.

In scenario 100, all points of piecewise linear approximation 150*b* connecting two line segments; i.e., control point 124, midpoint 140, and midpoint 142, are flat enough, and so piecewise linear approximation 150*b* is close enough to edge curve 120. Thus, for scenario 100, the piecewise linear approximation algorithm operating on edge curve 120 outputs piecewise linear approximation 150*b*.

Scenario 100 proceeds with the piecewise linear approximation algorithm being executed for each non-linear Bezier curve forming an edge of a patch of specification 110 to generate corresponding piecewise linear approximations. Then, the computing device replaces the non-linear Bezier curves forming edges of specification 110 by the corresponding piecewise linear approximations. As an example shown at lower left of FIG. 1, edge curve 120 of four-corner smooth shading patch 112 has been replaced by piecewise linear approximation 150*b* to form updated four-corner smooth shading patch 160.

Scenario 100 continues with the computing device tessellating the updated patches. Tessellation of a patch (or other surface) involves determining a covering of the patch with smaller shapes of one or a few types. For example, four-corner smooth shading patch 160 has been tessellated using triangle 174 and quadrilaterals (Qs) 170, 172, and 176. FIG. 1 also shows, at lower center, tessellated representation 180 of specification 110, where tessellated representation 180 includes patches of specification 110 (including four-corner smooth shading patch 160) after replacement with piecewise linear approximations of Bezier curves and after tessellation.

An updated patch can be divided or tessellated into "fundamental graphics shapes" such as lines, triangles, rectangles, and trapezoids using a herein-described patch dividing algorithm. Then, to render the patch, each fundamental graphics shape of the patch can be represented as one or more pixels; each pixel having a color that can be calculated using linear and/or bi-linear interpolation. Using linear and/or bi-linear interpolation for coloring fundamental graphics shapes can reduce the number of fundamental graphics shapes required to divide or tessellate the patch. For example, if each fundamental graphics shape for a patch is restricted to be mono-colored, then a relatively large number of fundamental graphics shapes may be required to be processed when colors vary over the patch, as fundamental graphics shape having multiple colors would have to be further divided or tessellated to meet the mono-coloring restriction for the fundamental graphics shape. Further, if dividing a patch into fundamental graphics shapes is performed without hardware assistance, rendering performance may be relatively slow and memory consumption for the relatively large number of fundamental graphics shapes may be relatively high.

Scenario 100 can proceed with the computing device rendering an image of the elliptical object represented by tessellated representation 180. A resulting rendered image is shown at lower right of FIG. 1 as rendered object 190. After the computing device renders rendered object 190, scenario 100 can end.

FIG. 2A is a flowchart for method 200 for rendering an image of at least part of an object O, where O is specified using patches, according to an example embodiment. Method 200 can be carried out by a computing device, such as computing device 1000 discussed below in the context of FIG. 10.

Method 200 can begin at block 210, where the computing device can receive a specification S of an object O to be at least partially rendered, S having four-corner smooth shading patches P1 . . . Pn, n>0. For example, the specification S and/or object O can be associated with an image, such an image of a rendering of at least part of object O.

At block 220, the computing device can determine a shape list SL of shapes representing patches P1 . . . Pn and corresponding color list CL of colors at patch corners. Shape list SL and color list CL can be determined using method 250.

Figure 2B:
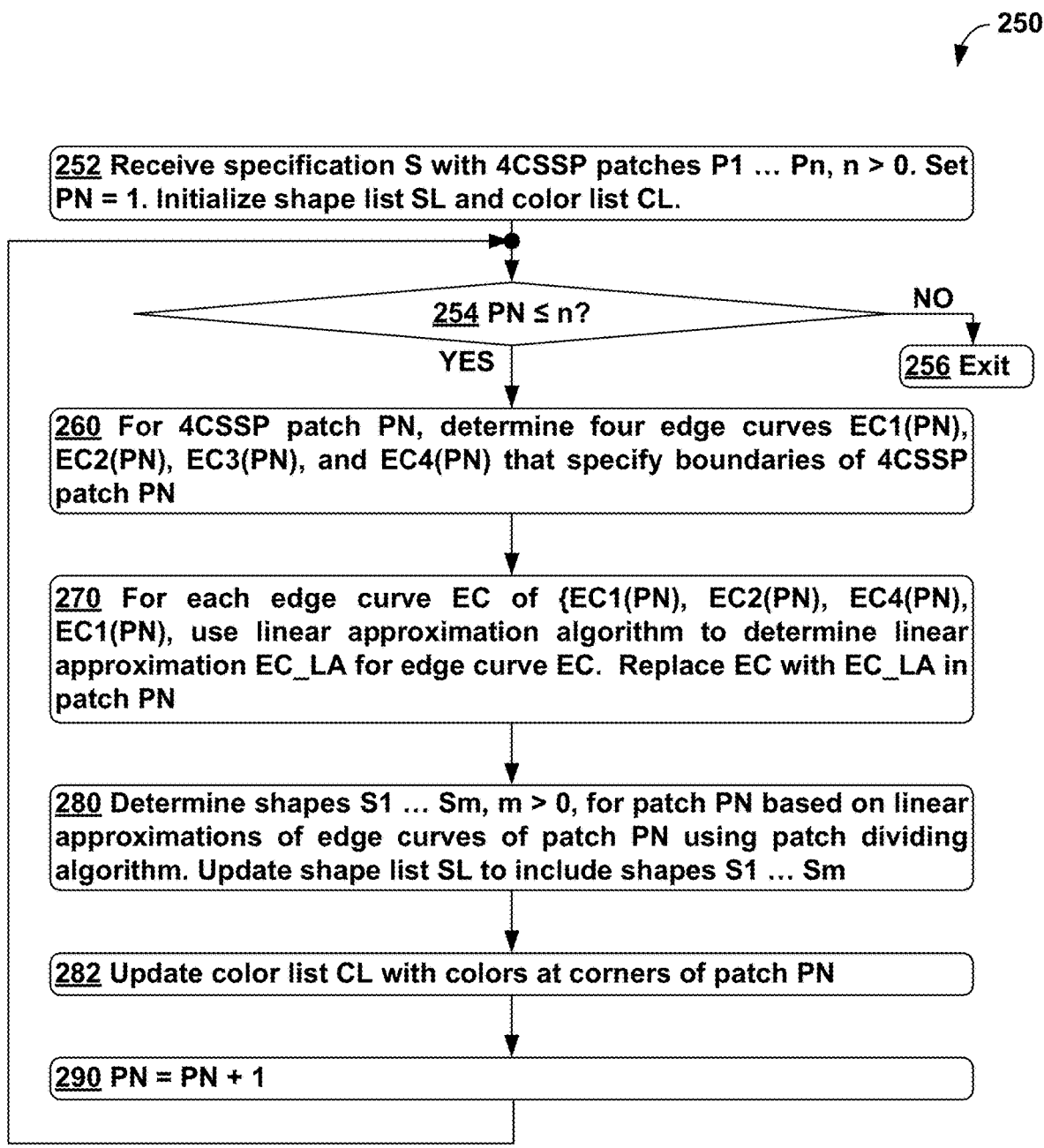
FIG. 2B is a flowchart of a method for determining a shape list and a corresponding color list representing at least one patch, according to an example embodiment.

FIG. 2B shows that method 250 can begin at block 252, where the computing device can receive the specification S with n 4CSSP patches P1 . . . Pn with n>0. At block 252, the computing device can also set a value PN equal to 1 and initialize data; e.g., initialize shape list SL and color list CL.

At block 254, the computing device can determine whether the value PN is less than or equal to n. If the computing device determines that PN is less than or equal to n, then the computing device can proceed to block 260. Otherwise, the computing device can determine that PN is greater than n and can proceed to block 256.

At block 256, the computing device can exit method 250. In some cases, exiting the method 250 can terminate the procedures of block 220 of method 200.

At block 260, the computing device can select a four-corner smooth shading patch PN from specification S. Then, for four-corner smooth shading patch PN, the computing device can determine four edge curves EC1(PN), EC2(PN), EC3(PN), and EC4(PN) that specify edges between corners of four-corner smooth shading patch PN; i.e., EC1(PN), EC2(PN), EC3(PN), and EC4(PN) can specify boundaries of four-corner smooth shading patch PN.

At block 270, the computing device can, for each edge curve EC in the set {EC1(PN), EC2(PN), EC3(PN), EC4(PN)}: determine a piecewise linear approximation EC_LA for edge curve EC, and (2) replace EC with EC_LA in four-corner smooth shading patch PN. For example, the computing device can use the piecewise linear approximation algorithm discussed above in the context of FIG. 1 to determine piecewise linear approximation EC_LA that is close enough to edge curve EC. And, as also discussed above in the context of FIG. 1, the computing device can update four-corner smooth shading patch PN by replacing edge curve EC of with piecewise linear approximation EC_LA.

As shown in FIG. 2B, at block 280, the computing device can use a patch dividing algorithm discussed above to determine shapes S1 . . . Sm, m>0 for four-corner smooth shading patch PN based on the piecewise linear approximations of edge curves used in updating four-corner smooth shading patch PN. After determining shapes S1 . . . Sm, the computing device can update shape list SL to include shapes S1 . . . Sm; e.g., shapes S1 . . . Sm can be added to shape list SL.

The computing device can follow the following patch dividing algorithm to tessellate or divide a four-corner smooth shading patch PN to determine shapes S1 . . . Sm, where each of s shapes S1 . . . Sm can be fundamental graphics shapes. The patch dividing algorithm can determine a reasonable number m of shapes for patch PN for the performance of subsequent processing.

The patch dividing algorithm can involve the following three steps:

1. The computing device can determine a number of divisions NDiv for patch PN based on a maximum number of line segments used to represent edge curves in each of the two dimensions of the unit square associated with NDiv.

For example, let PN have four corners C1, C2, C3, and C4 and be bounded by four edge curves EC1(PN), EC2(PN), EC3(PN), and EC4(PN). As PN is bounded by the edge curves, let EC1(PN) and EC2(PN) intersect at corner C1 of patch PN, EC2(PN) and EC3(PN) intersect at corner C2, EC3(PN) and EC4(PN) intersect at corner C3 of patch PN, and EC4(PN) and EC1(PN) intersect at corner C4 of patch PN. That is, if patch PN was a unit square, EC1(PN) would be parallel to EC3(PN) and EC2(PN) would be parallel to EC4(PN).

Figure 3:
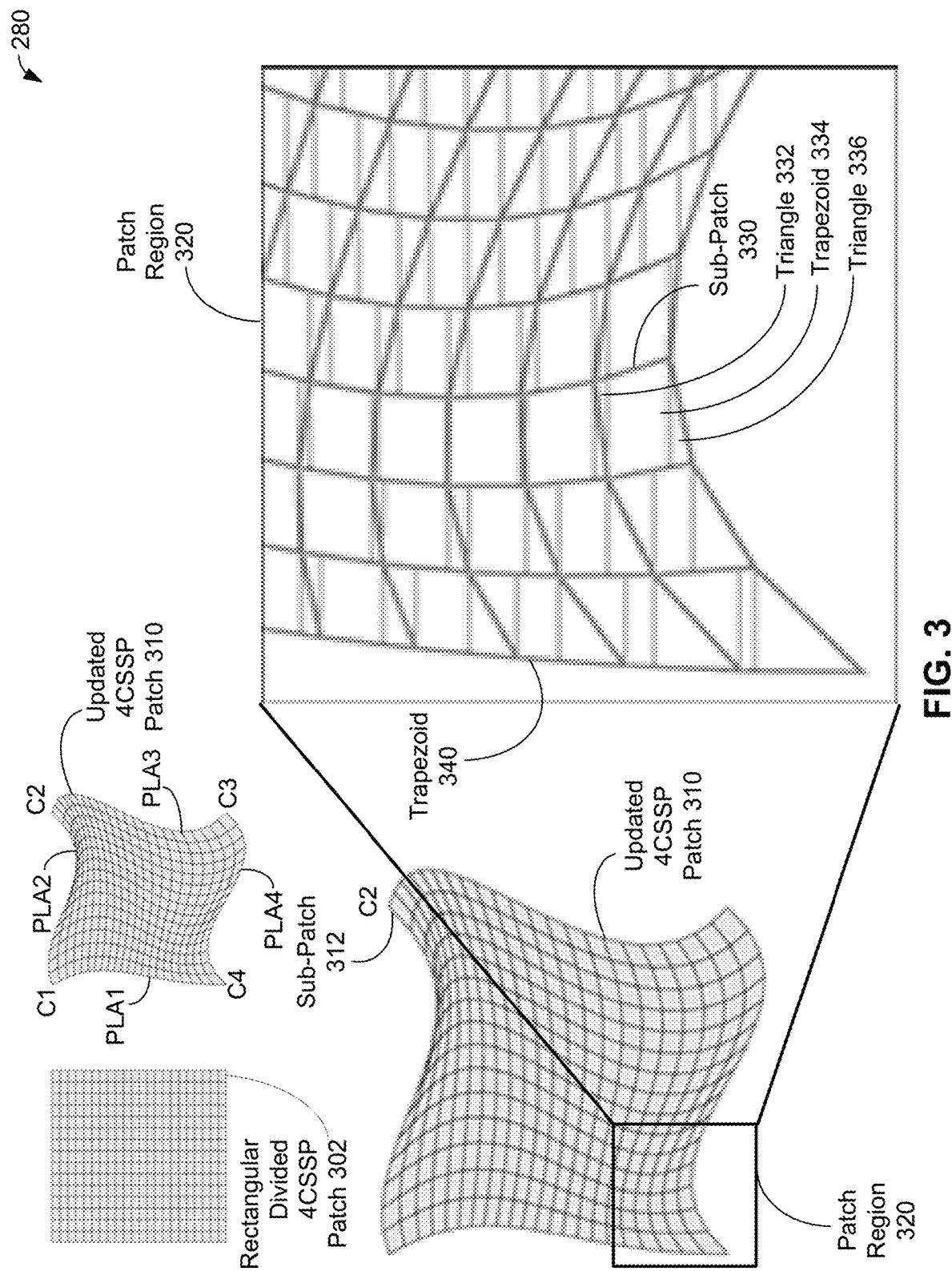
FIG. 3 shows an example patch divided into quadrilaterals and triangles, according to an example embodiment.

Then let EC1(PN), EC2(PN), EC3(PN), and EC4(PN) have four respective piecewise linear approximations PLA1, PLA2, PLA3, PLA4 with the respective piecewise linear approximations having respective numbers of line segments NumLS1, NumLS2, NumLS3, NumLS4. An upper portion of FIG. 3 shows example updated four-corner smooth shading patch 310 with four corners C1, C2, C3, and C4 and piecewise linear approximations PLA1, PLA2, PLA3, PLA4 connecting the four corners. Also set pair PP1 of piecewise linear approximations equal to {EC1_LA(PN), EC3_LA(PN)} and set pair PP2 of piecewise linear approximations equal to {EC2_LA(PN), EC4_LA(PN)}.

Further, let PP1_MAX be the piecewise linear approximation of pair PP1 that has the maximum number of line segments of pair PP1; e.g., PP1_MAX is the piecewise linear approximation whose number of line segments equals max(NumLS1, NumLS3). Also, let PP2_MAX be the piecewise linear approximation of pair PP2 that has the maximum number of line segments of pair PP2. Then, let m be set to a value based on a product of number of line segments for PP1_MAX and a number of line segment for PP2_MAX; i.e., m is based on max (NumLS1, NumLS3)*max (NumLS2, NumLS4).

2. Use piecewise linear approximations PP1_MAX and PP2_MAX to divide patch PN into quadrilaterals. For example, max (NumLS1, NumLS3) lines can be drawn from each endpoint of a line segment of PP1_MAX to a corresponding point on the piecewise linear approximation on an opposite side of PP1_MAX. Also, max (NumLS2, NumLS4) lines can be drawn from each endpoint of a line segment of PP2_MAX to a corresponding point on the piecewise linear approximation on an opposite side of PP2_MAX. These lines can be used to define quadrilaterals that divide or tessellate patch PN. Since the input coordinates of the forward mapping (u, v) is limited in the unit square, the dividing points in u-v coordinate space are given the coordinates of line segments in PP1_MAX and PP2_MAX.

An upper portion of FIG. 3 shows rectangular divided 4CSSP patch 302 and corresponding updated divided 4CSSP patch 310, each of which has been divided into 15×22 quadrilateral sub-patches. Rectangular divided 4CSSP patch 302 shows sub-patches in the unit square associated updated divided 4CSSP patch 310 with and updated divided 4CSSP patch 310 shows a result of the patch dividing algorithm.

3. In some applications, fundamental graphics shapes do not include quadrilaterals. As an example, some applications use lines, triangles, trapezoids, and rectangles as fundamental graphics shapes. However, at step 2 of the patch dividing algorithm, quadrilaterals were used to divide a patch, such as the quadrilaterals shown in updated divided 4CSSP patch 310 of FIG. 3. Some sub-patches may have a quadrilateral shape that is also a fundamental graphics shape; e.g., a rectangle or trapezoid for these applications. However, in some cases, a sub-patch may have a (quadrilateral) shape that is not a fundamental graphics shape. Then, each sub-patch whose shape is not a fundamental graphics shape can be further divided or tessellated into fundamental graphics shapes.

Many objects can be defined in terms of multiple patches, and boundaries of patches are often shared with other patches for such objects. In some examples, the patch dividing algorithm can indicate that an edge curve is a shared boundary edge between patches and/or share one edge curve at a boundary between two patches. Beneficially, sharing of boundary edge curves (and therefore, related piecewise linear approximations) can both save memory used to specify boundary edge curves and reduce or eliminate "cracks" due to different representations of boundary edge curves in adjacent patches in a corresponding rendered results. Also, the herein-described patch division algorithm can lead to a reduced number of shapes compared with prior implementation, beneficially reducing time and memory required to render objects.

A lower portion of FIG. 3 shows example four-corner smooth shading patch 310 divided into trapezoids, rectangles, and triangles, according to an example embodiment. An expanded view of updated four-corner smooth shading patch 310 is shown at lower left of FIG. 3, where updated four-corner smooth shading patch 310 includes sub-patches including sub-patch 312 shown at corner C2. In the example shown in FIG. 3, each sub-patch of updated four-corner smooth shading patch 310 has a quadrilateral shape, as these sub-patches were generated by the first two steps of the herein-described patch dividing algorithm.

An expanded view of lower-left patch region 320 of four-corner smooth shading patch 310 is shown at right of FIG. 3. The expanded view shows quadrilateral sub-patch 330 that has been divided tessellated into three fundamental graphics shapes: trapezoid 334 and triangles 332 and 336 per step 3 of the patch dividing algorithm. Other quadrilateral sub-patches shown in the expanded view of patch region 320 are also shown as being tessellated into three types of fundamental graphics shapes—rectangles, triangles, and trapezoids. In some examples, rectangles are treated as special cases of trapezoids—in these examples, a patch, such as four-corner smooth shading patch 310, can be tessellated into two types of fundamental graphics shapes: triangles and trapezoids. In other examples, only one type of fundamental graphics shape; e.g., a triangle, is used—in these other examples, patch, such as four-corner smooth shading patch 310, can be tessellated into triangles only. Other tessellations of patches are possible as well.

Returning to FIG. 2B, at block 282 of method 250, the computing device can update color list CL with colors at corners of patch PN. The colors at corners of patch PN should be the same as colors at corners of the unit square associated with patch PN, where the unit square can be used to define u and v coordinates for points associated with patch PN. Then, given u and v coordinates for a location L1 associated with patch PN, linear and/or bi-linear interpolation of the colors at the corners of the unit square can be used to determine colors at the location L1, including corner locations of fundamental graphics shapes used to divide or tessellate patch PN.

The interpolated colors can be determined based on the u and v coordinates stored in shape list SL and corner colors stored in color list CL. The u and v coordinate values corresponding for a pixel to be rendered can be calculated and passed down to the hardware graphics unit where linear and/or bi-linear interpolation will be executed. The actual color on a particular pixel Pix of shape S in the shape list SL, where pixel Pix has u and v coordinates $(u_{Pix}, v_{Pix})$ is determined by the unit square bi-linear interpolation which requires u and v values and the set of the four colors expressed in Equation (4) below:

$$C(u_{Pix}, v_{Pix}) = C(0,0)(1-u_{Pix})(1-v_{Pix}) + C(1,0)u_{Pix}(1-v_{Pix}) + C(0,1)(1-u_{Pix})v_{Pix} + C(1,1)u_{Pix}v_{Pix} \quad (4)$$

where $C(0,0)$, $C(1,0)$, $C(0,1)$ and $C(1,1)$ are the colors of the four corners of the unit square associated with the patch divided or tessellated using shape S.

To speed color processing, the computing device can determine u and v coordinates for each corner of each shape S1 ... Sm, and add the u and v coordinates for the corners of shapes S1 ... Sm to the shape list SL. Then, Equation (4), operating on the u and v coordinates for a particular corner point CP of a shape Sx in shape list SL and the colors of four corners of the unit square associated with the patch divided or tessellated using the shape Sx, can be used to determine the color of corner point CP.

Shape list SL can also include geometry information about each shape S1 ... Sm. Thus, shape list SL includes both geometry information about shapes S1 ... Sm and u and v coordinates of each corner point of each shape S1 ... Sm.

In some examples, color list CL can include colors for each corner of each shape S1 ... Sm; in these examples, u and v coordinates for each corner point of each shape S1 ... Sm may not be provided in shape list SL. However, for at least some of these examples, using color information at corners of shapes listed in shape list SL (rather than using u and v coordinates for corners and then performing linear and/or bi-linear interpolation of colors specified for patches to determine colors at corners of shapes listed in shape list SL, as discussed above) may lead to visible color artifacts during rendering. Such color artifacts occur due to performing bi-linear interpolation at the rendering stage as some color components could not correctly contribute to the desired shading color after patches have been divided into fundamental graphics shapes.

The colors for a pixel, corner, shape, patch, or other graphics object can be expressed using a color model, such as a grayscale color model, a Red-Green-Blue (RGB) color model, a Cyan-Magenta-Yellow-Black (CYMK) color model, a Hue-Saturation-Value (HSV) color model, or some other color model. In some cases, colors can be expressed parametrically. For example, a parametric value t and a one-input function $f(t)$ can be used to define the four corner colors instead of the specific color values. In this case, the four corner colors $C(0,0)$, $C(1,0)$, $C(0,1)$ and $C(1,1)$ are given by four t values, $t_0$, $t_1$, $t_2$ and $t_3$. Then, actual color values are determined by function $f(t)$. Therefore the parametric t values should be considered as a type of color model. At the rendering stage, the one-input function can be represented as one or more look up tables which can have the appropriate size to cover the color interval.

The herein-described hardware graphics unit can process the information in color list CL and shape list SL. The hardware graphics unit can determine a transfer region of pixels based on the shape information in shape list SL. For each pixel in the transfer region, the hardware graphics unit can determine u and v coordinates for the pixel from the provided u and v coordinates in shape list SL.

Then, the color of the pixel can be determined by the bi-linear interpolation using the u and v coordinates for the pixel and Equation (4). For an example of a fundamental graphics shape of a trapezoid that can be decomposed into horizontal lines of pixels or "scan lines", the hardware graphics unit can determine u and v coordinates of a top scan line of the trapezoid using u and v coordinates of an upper left corner of the trapezoid, u and v coordinates of an upper right corner, and a length of the scan line. For each following scan line, the hardware graphics unit can determine u and v coordinates for a left edge pixel of the scan line and the u and v coordinates for a right edge pixel of the scan line using u and v coordinates for the upper left and right corners along with left and right slope values for the trapezoid. In some examples, the trapezoid's left and right slope values can be converted into an increment (or decrement) value for each of the u and v coordinates per scan line.

At block 290, the computing device can increment the value PN by 1; e.g., the computing device can calculate PN=PN+1. After incrementing the value PN, the computing device can proceed to block 254 of method 250.

Returning to FIG. 2A, at block 230 of method 200, the computing device can calculate pixel colors for a grid of pixels PIX for shapes in shape list SL using linear and/or bi-linear interpolation of colors in color list CL. For example, a shape S1 associated with patch P1 in shape list SL can be mapped to one or more pixels in grid of pixels PIX. Then, for each pixel PIX1 mapped to shape S1, a location L(PIX1) within shape S1 can be determined, where L(PIX1) can be expressed in terms of the coordinate system of the unit square for patch P1. The color for L(PIX1) can then be determined using linear and/or bi-linear interpolation of colors at the corners of the unit square to determine a color C_PIX1 at L(PIX1), and so pixel PIX1 can have color C_PIX1.

Figure 4:
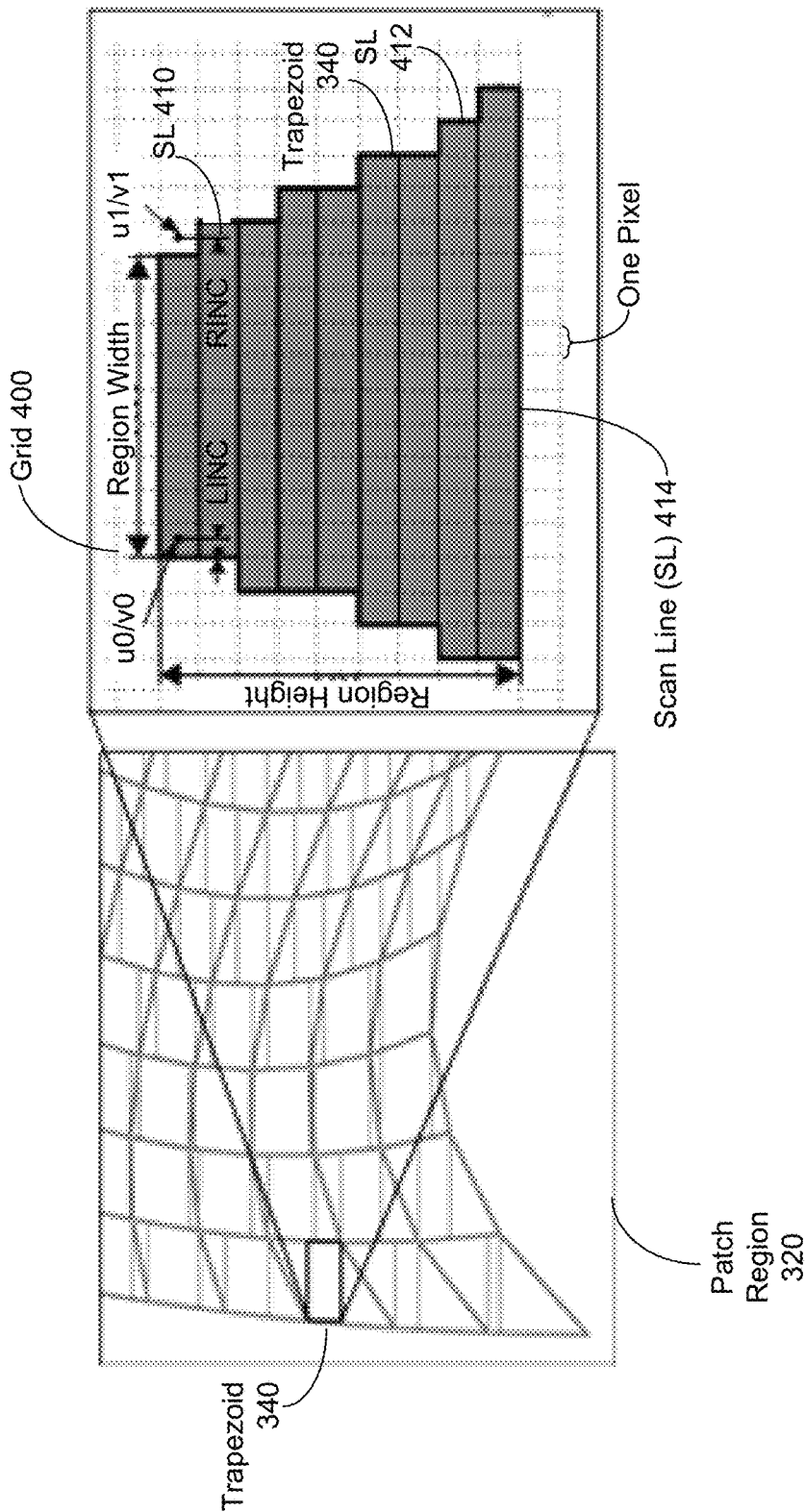
FIG. 4 depicts a mapping of a trapezoid to a UV coordinate grid, according to an example embodiment.

FIG. 4 depicts a mapping of trapezoid 340 to u and v coordinate grid of pixels 400, according to an example embodiment. As shown at left of FIG. 4, trapezoid 340 is a trapezoid in patch region 320, which in turn is a region of updated four-corner smooth shading patch 310.

At right of FIG. 4, trapezoid 340 is shown in grid of pixels 400. In particular, trapezoid 340 is shown divided into nine scan lines of pixels within grid of pixels 400, including scan lines (SLs) 410, 412, 414. Rendering software can calculate u and v coordinate values for each of four vertices of trapezoid 340, and store and/or provide u and v coordinate values of a left side and a right side of trapezoid 340, trapezoid region height and width values, initial values u0/v0, u1/v1, left side incremental value LINC, and right side incremental value RINC, as shown in FIG. 4.

Then, for each scan line of trapezoid, the graphics hardware unit can calculate the left and the right side u and v coordinate values. The graphics hardware unit can then use linear interpolation to calculate an individual pixel's u and v coordinate values inside a scan line. After determining u and v coordinate values inside a scan line, the graphics hardware unit can use Equation (4) to perform bi-linear interpolation using the individual pixel's u and v coordinate values to get the smooth shading color values for the individual pixel.

During block 230 of method 200, the computing device can generate and execute commands referring to shape list SL and color list CL to render the object by generating grid of pixels PIX. Some of these commands, like command 500 of FIG. 5, can be commands to the hardware graphics unit.

Figure 5:
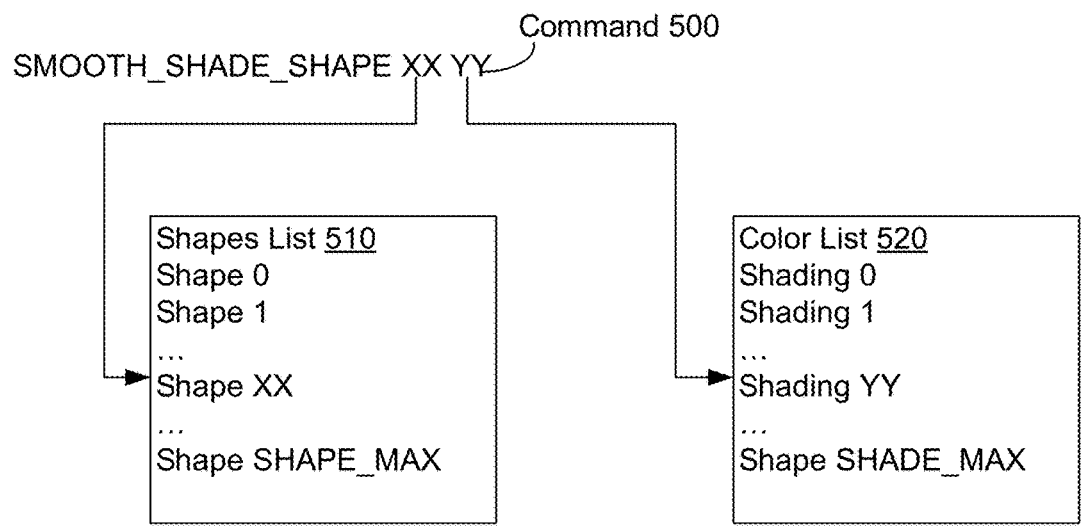
FIG. 5 shows a command for smooth shading and related data structures, according to an example embodiment.

FIG. 5 shows command 500 for smooth shading and related data structures, according to an example embodiment. Command 500 is a command to the hardware graphics unit to "SMOOTH_SHADE_SHAPE" with references to shape "XX" and shading "YY", where "XX" is a shape in shape list 510, and "YY" is a color in color list 520. That is, command 500 instructs hardware graphics unit to render shape XX using smooth shading (e.g., apply linear and/or bi-linear interpolation of colors) with color(s) YY.

As mentioned above and as illustrated in FIG. 5, the hardware graphics unit receives a shape list, such as shape list 510, and a color list, such as color list 520, as inputs which relate to smooth shading and perhaps other commands, such as command 500. Shape list 510 can include for each shape: geometry information for the shape, a bounding box for the shape, and u and v coordinates of each corner point. The shape list specifier for a shape can specify a type of shape (e.g., a horizontal line, a vertical line, a triangle, a trapezoid, a rectangle, a clipped trapezoid) and dimensions of the shape. A bounding box for the shape can specify a smallest rectangular region of space that fully encloses the shape. The bounding box can be expressed as coordinates of two or more corners of the rectangular region—for example, u and v coordinates for each of an upper-left corner and a lower-right corner of the rectangular region. In some cases, shape list 510 can list only fundamental graphics shapes. In the specific example shown in FIG. 5, shape list 510 lists SHAPE_MAX shapes.

Color list 520 can provide color representations of those shapes as sets of four colors of four corners of a patch. In some examples, color list 520 can also include u and v coordinates corresponding to each shape. Other data related to coloring and/or rendering shapes, such as stenciling and/or mask information, can be included in color list 520 as well. In the specific example shown in FIG. 5, color list 520 lists SHADE_MAX colors.

Returning to FIG. 2A, at block 240 of method 200, the computing device can generate output that includes at least part of grid PIX. For example, the output can include an image that includes at least part of a rendering of object O. More specifically, the output can include a display of at least part of the image and/or at least part of the rendering of object O, a file that stores at least part of the image and/or at least part of the rendering of object O, and/or a paper output that includes at least part of the image and/or at least part of the rendering of object O. Upon completion of the procedures of block 240, method 200 can be completed.

Figure 6A:
FIG. 6A depicts a computer representation of an object specified using patches generated using a prior technique.

FIG. 6A depicts specification 600 of an object specified using patches generated using a first prior technique. In the first prior technique, each patch is tessellated into mall quadrilateral polygons. The small quadrilateral polygons can then be painted with a solid color using a vector fill operation. In some cases, use of solid colors incurs a color conversion cost per each quadrilateral polygon.

Figure 6B:
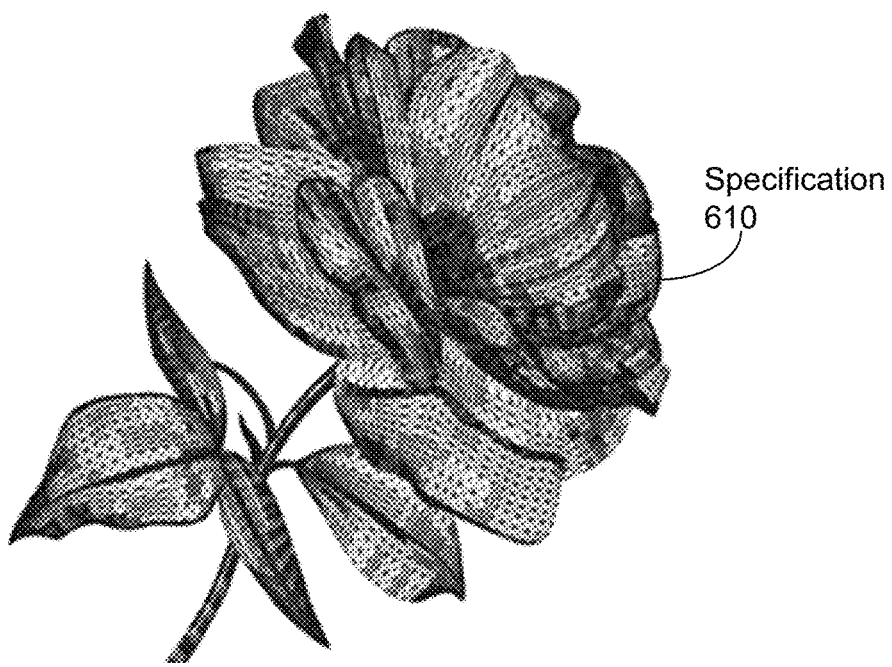
FIG. 6B depicts a computer representation of an object specified using patches generated using another prior technique.

FIG. 6B depicts specification 610 of the same object shown in FIG. 6A, where specification 610 is specified using patches generated using a second prior technique. The second prior technique divides or tessellates patches into triangles. Also, in the second prior technique, colors of the triangles are processed using triangle color interpolation. During triangle color interpolation, some or all of these triangles are divided into small rectangles that can be painted with one solid color. This triangle color interpolation process leads to using a huge amount of memory to store those many small rectangles.

Figure 7A:
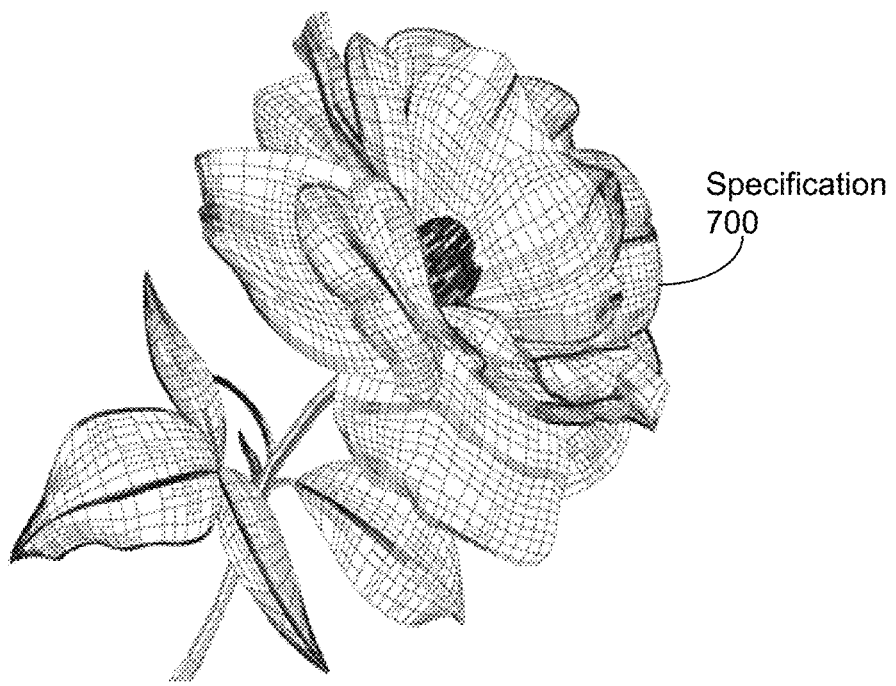
FIG. 7A depicts a computer representation of an object specified using patches, according to an example embodiment.
Figure 7B:
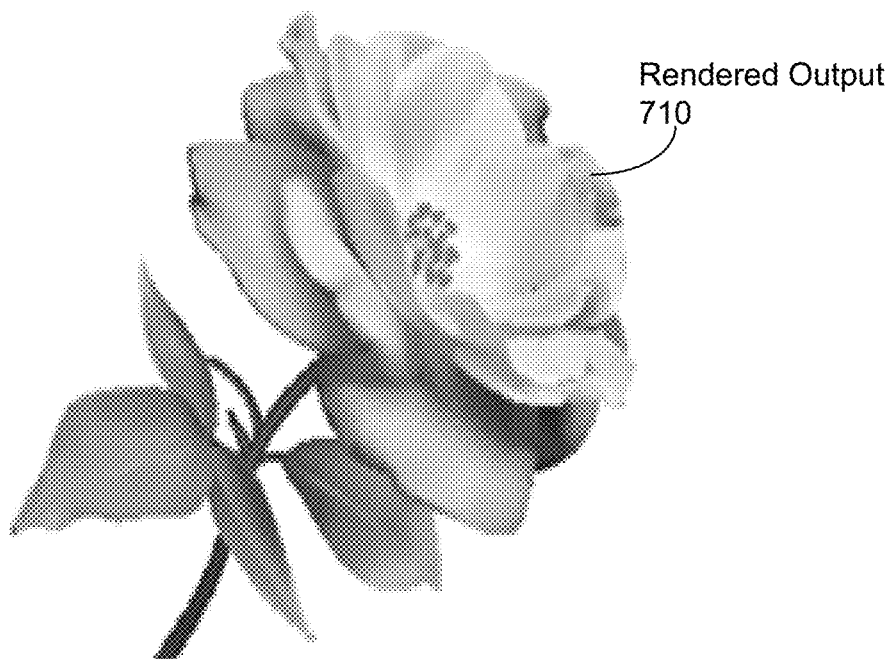
FIG. 7B depicts a rendered object specified using the patches depicted in FIG. 7A, according to an example embodiment.

FIG. 7A depicts specification 700 of the same object shown in FIGS. 6A and 6B, where specification 700 is specified using patches generating according to the procedures of method 200, according to an example embodiment. And, FIG. 7B depicts a rendered object 710 specified using specification 700 shown in FIG. 7A, according to an example embodiment. Originally, rendered object 710 was rendered into a 240×190 grid of pixels, which in some output media, is a relatively small space; e.g., the grid of pixels may be rendered into a space within a half inch square As can be seen in FIGS. 6A, 6B, and 7A prior-generated specifications 600 and 610 of respective FIGS. 6A and 6B have a relatively large number of polygons in comparison to specification 700 shown in FIG. 7A. In some examples, the herein-described techniques generate one or more orders of magnitude fewer polygons than generated by either the first or the second prior technique, thereby reducing the amount of memory and related processing time and power required to render an image, such as rendered output 710. This reduction in the amount of memory and related processing can be provided in part by using fundamental graphics shapes that can have multiple colors, as discussed above in the context of method 200, rather than using mono-colored fundamental graphics shapes as used in the prior techniques. Also, use of a dedicated hardware graphics unit as described herein can beneficially further reduce rendering time compared to the use of prior techniques.

Figure 8:
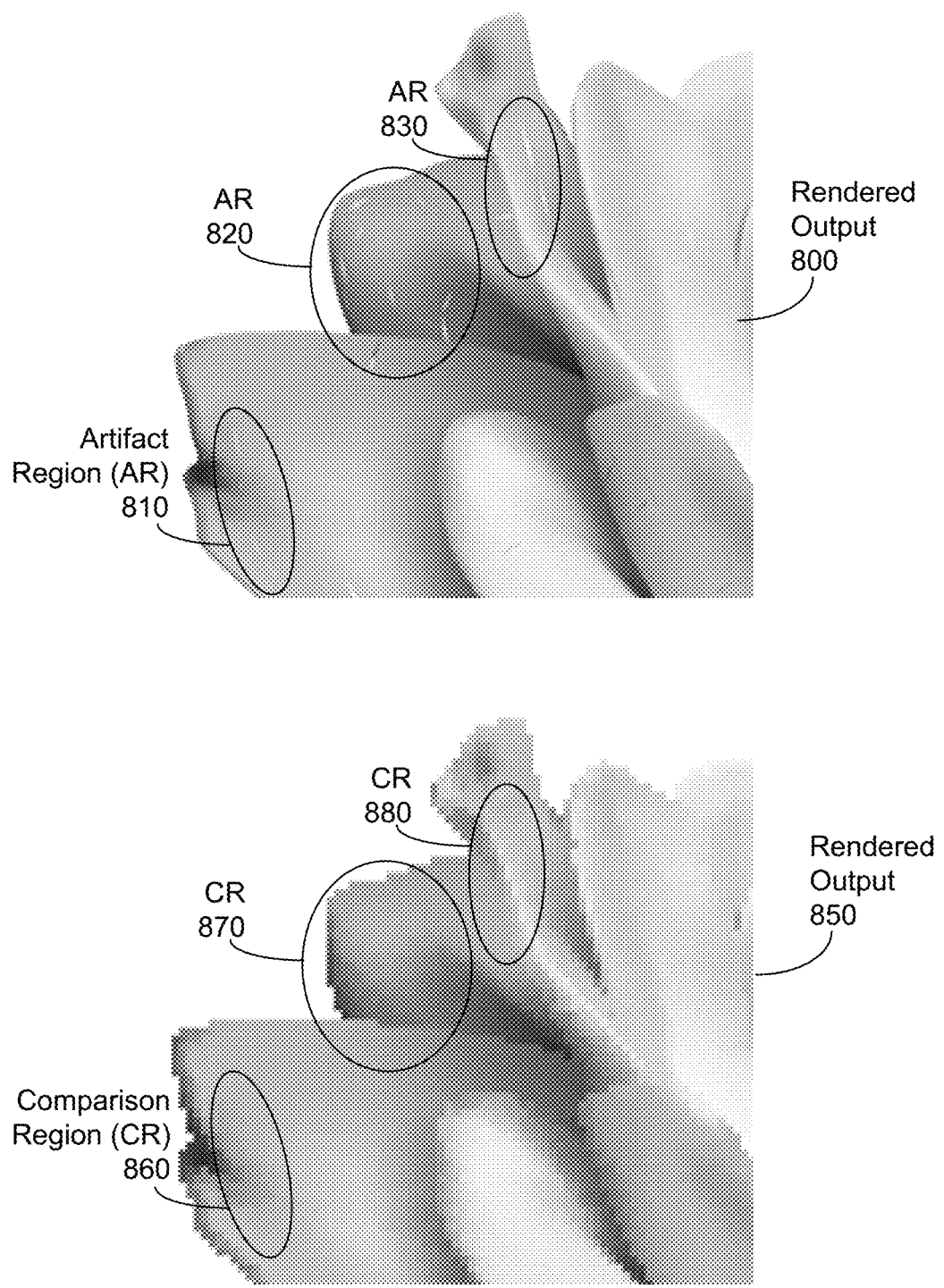
FIG. 8 depicts a portion of an object rendered without utilizing a pixel placement technique and a portion of an object rendered utilizing a pixel placement technique, according to an example embodiment.

FIG. 8 depicts a portion of rendered output 800 rendered without utilizing a pixel placement technique and a portion of rendered output 850 rendered utilizing a pixel placement technique, according to an example embodiment. Rendered output 800 and rendered output 850 are both renderings of the objects specified in FIGS. 6A, 6B, and 7A.

One reason for these artifacts is that some techniques render results with unpainted pixels present. To address unpainted pixel artifacts, a pixel placement rule that specifies how partially intersecting pixels are filled—a partially intersecting pixel is a pixel that is partly, but not completely, covered by a rendering of an object. Rendered output 800 is an image of petals of a flower that was generated without use of a pixel placement rule, leading to unpainted pixels appearing in rendered output 800 as "thin crack" artifacts in artifact regions (ARs) 810, 820, 830. Rendered output 850 is an image of petals of a flower rendered using a pixel placement rule that does not have any missing pixels on petals. Rather, as shown in comparison areas (CR) 860, 870, and 880 of rendered output 850, thin crack artifacts are absent.

In some examples, applying the pixel placement rule could theoretically allow thin crack artifacts between approximated patches. However, a width of a thin crack artifact can be controlled. Then, a controlled width of a thin crack artifact can be determined based on a resolution of rendered output. Rendered output 800 indicates that thin cracks may be observed approximated patches for the printing device in much more higher resolution, particularly when a pixel placement rule is not used. On the other hand, rendered output 850 shows that thin cracks may be removed, including at lower resolutions, when approximated patches are rendered with a pixel placement rule.

One way to control width of a thin crack artifacts is to control a "flatness value" while performing piecewise linear approximations, where the flatness value specifies a maximum gap between an actual curve and an approximating line segments. For example, if a flatness value is less than 0.5 pixel, then any thin cracks that may occur between adjacent patches are less than 1.0 pixel, and so applying the pixel placement rule would cover any such thin cracks, since the thin cracks are less than one pixel wide.

Figure 9:
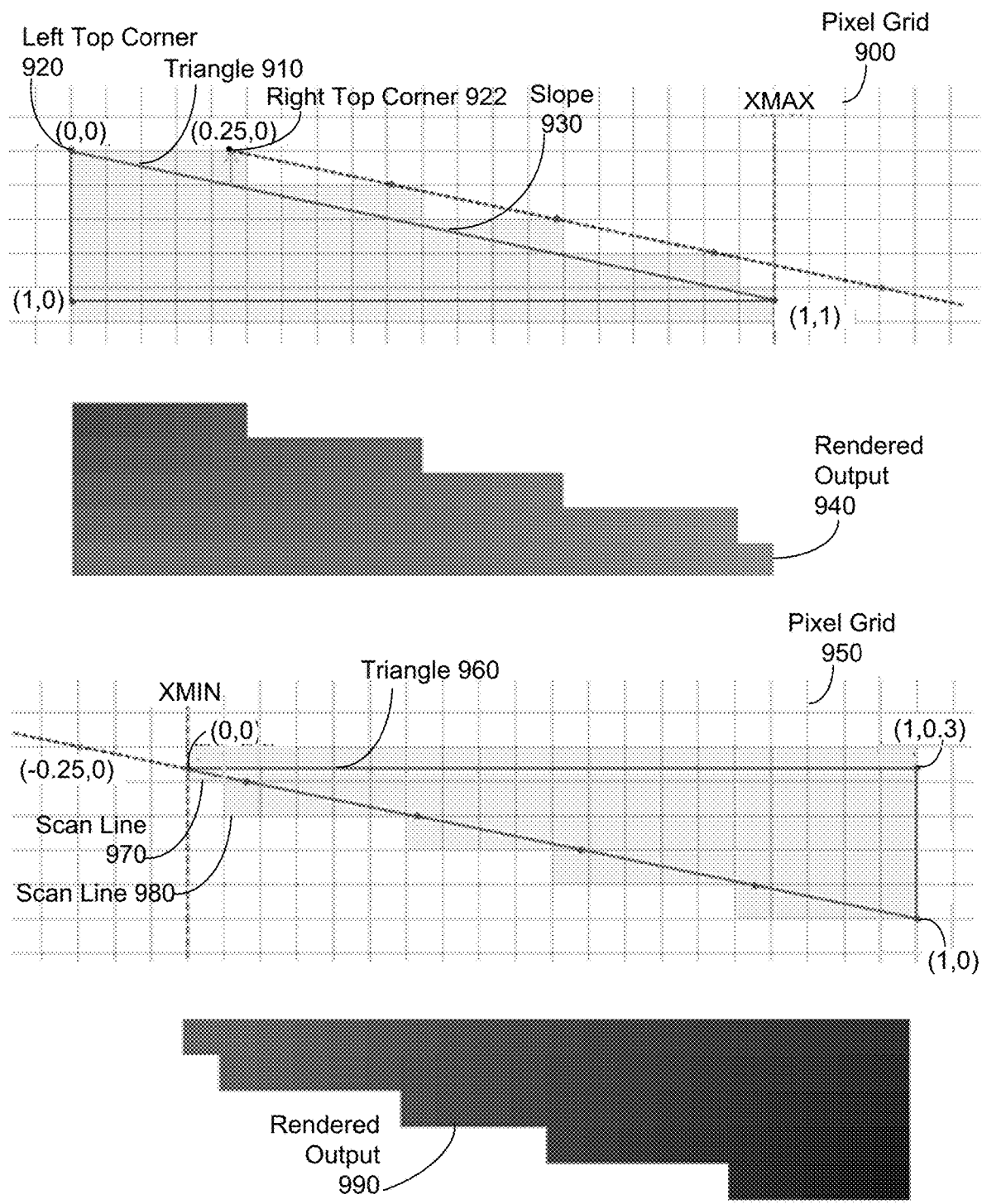
FIG. 9 depicts images related to a pixel placement rule, according to an example embodiment.

FIG. 9 depicts images related to the pixel placement rule, according to an example embodiment. The rendering software can use one or more of the herein-described pixel placement rules (sometimes called scan conversion rules) to address thin crack artifacts. The pixel placement rule specifies that all pixels that a shape intersects are painted regardless of how large (or small) of a portion of a pixel is intersected by the shape. Therefore, all pixels touched by a shading object will be painted. As such, if the width of a thin crack is smaller than 1.0 pixel, the thin crack would not appear on the rendered results.

At an upper portion of FIG. 9, triangle 910 in pixel grid 900 is to be rendered by the rendering software according to the pixel placement rule. Pixels of pixel grid 900 shown as filled in grey intersect triangle 910 and so should be colored (or painted) during rendering according to the pixel placement rule when triangle 960 is rendered. Rendered output 940, shown at upper middle of FIG. 9, shows actually rendered pixels for triangle 910—note that the pixels of rendered output 940 align with the grey pixels shown in pixel grid 900. Pixels in pixel grid 900 and pixel grid 950 are located using x and y coordinate values that are distinct from u and v coordinates used in coloring/painting pixels.

To follow the pixel placement rule, the rendering software can determine right top corner 922 of triangle 910 by determining a rightmost pixel touched by slope 930 of triangle 910 based on slope 930 and a decimal portion of the y-coordinate of right top corner 922. Without using the pixel placement rule, left top corner 920 and right top corner 922 would be rendered as one pixel located at left top corner 920 in rendered output 940. Then, thin crack artifacts would occur in the rendered result; e.g., along the rendered portion of slope 930. The rendering software can use a trapezoid to model the pixels to be rendered for triangle 910. In some cases, the rendering software can use an incremental x-coordinate value that is the same as an incremental x-coordinate value to determine a rightmost pixel of each scan line used to rendered triangle 910. However, if slope 930 projects too far along a right edge of rendered output 940, then rendered output 940 could extend beyond a specified maximum right edge for a bottom scan line; e.g., the bottom scan line could go past the point marked (1,1) of triangle 910. To keep rendered output 940 from extending beyond the specified maximum right edge, the rendering software can use a "clipped trapezoid" that does not include any pixels beyond a maximum x-coordinate, shown in FIG. 9 as "XMAX" of pixel grid 900. Generally speaking, a clipped trapezoid does not include any pixels beyond: a minimum x-coordinate, a maximum x-coordinate, a minimum y-coordinate, a maximum y-coordinate, and/or combinations thereof.

The pixels in rendered output 940 are colored in shades of grey using bi-linear interpolation; i.e., as indicated by Equation (4). Coordinate-numbered points in pixel grid 900 show u and v coordinates for the point; e.g., the coordinate-numbered point (0.25, 0) shown as right top corner 922 of pixel grid 900 has a corresponding u coordinate value of 0.25 and a corresponding v coordinate value of 0. Left top corner 920, having u and v coordinates of (0, 0) is associated with a red color, which appears in rendered output 940 as relatively-dark grey and a point having u and v coordinates of (1, 1) is associated with a green color, which appears in rendered output 940 as relatively-light grey. To present smooth shading color on a top scan line of rendered output 940, u and v coordinates of (0.25, 0) are used for right top corner 922. The u and v coordinates at point (1, 1) can be used to clip a u coordinate value of subsequent lines.

At lower middle of FIG. 9, triangle 960 in pixel grid 950 is to be rendered by the rendering software according to the pixel placement rule. In this example, negative u and v coordinates are used. Pixels of pixel grid 950 shown as filled in grey intersect triangle 960 and so should be colored (or painted) during rendering according to the pixel placement rule when triangle 960 is rendered. Rendered output 990, shown at bottom of FIG. 9, shows actually rendered pixels for triangle 960—note that the pixels of rendered output 990 align with the grey pixels shown in pixel grid 950.

In this example, the pixel placement rule moves a top left edge of triangle 960 to an intersection point with lower nearest integer y coordinate—this intersection point is shown as a "(0, 0)" point in pixel grid 950. A clipped trapezoid can be used with a minimum x-coordinate XMIN to keep rendered output 990 from extending beyond a specified minimum (of XMIN) for a left edge of triangle 960; e.g., keeps scan line 970 that includes point (0,0) from extending leftward of point (0, 0) within pixel grid 950. As an x increment value in this example involves a one integer shift in y coordinate values, scan line 980 is one pixel shorter than scan line 970. Thus, a left edge of scan lines below scan line 980 in pixel grid 950 can be computed from the adjusted top point of (0, 0).

The pixels in rendered output 990 are colored in shades of grey using bi-linear interpolation; i.e., as indicated by Equation (4). Coordinate-numbered points in pixel grid 950 show u and v coordinates for the point; e.g., the coordinate-numbered point (1, 0.3) shown as a right top corner of triangle 960 has a corresponding u coordinate value of 1 and a corresponding v coordinate value of 0.3. A left top corner of triangle 960, having u and v coordinates of (0, 0) is associated with a magenta color, which appears in rendered output 990 as relatively-light grey and a point having u and v coordinates of (1, 1) is associated with a dark blue color, which appears in rendered output 990 as relatively-dark grey or black. As the (0, 0) point was adjusted based on the XMIN value mentioned above, rendering of triangle 960 is based on a point having u and v coordinates of (−0.25, 0). When the color interpolation is executed within the first scan line, the leftmost u coordinate value of −0.25 can be clipped to a minimum clip value of 0. Then a u coordinate value increment corresponding to one pixel shift in an x-axis of pixel grid 950 can be determined from a length of an uppermost scan line of pixel grid 950 and the left and right top corner u and v coordinates of triangle 960—shown in FIG. 9 as respective points (0, 0) to (1.0, 0.3). For next scan line, the u and v coordinates for a left edge of triangle 960 as represented in pixel grid 950 can be calculated based on the point having u and v coordinates of (−0.25, 0) to maintain consistency of u and v coordinate values.

In some examples, applying the pixel placement rule to each fundamental graphics shape leads can cause the pixel to be colored (or painted) multiple times. When color blending operations, such alpha blending or blend mode, are disabled, duplicated pixel coloring will lead to a correct rendered result. However if these color blending operations are enabled, color blending may be specified to be executed with an original backdrop color that existed before painting the shading object. For example, a page description language specification can require that states that a shading pattern is to be treated as if it were implicitly enclosed in a non-isolated and knockout transparency group. This requirement means that any color blending operation should always be executed against the original backdrop color. If this page definition language specification is to be met, color blending executed with unintended colors (e.g., a color other than original backdrop color) could lead to undesirable visual artifacts in the rendered result.

Some particular shading objects, such as curved and overlapping surfaces, provide particular issues with multiply colored pixels. The rendering software can determine whether a defined surface has a large enough curvature to result in a curved and overlapped surface where one or more pixels are colored multiple times. Then, if a blending operation is involved during rendering a surface where one or more pixels are colored multiple times, the rendering software can solely use a front color of the surface when performing the blending operation.

Computing Device and Printing System Examples

Figure 10:
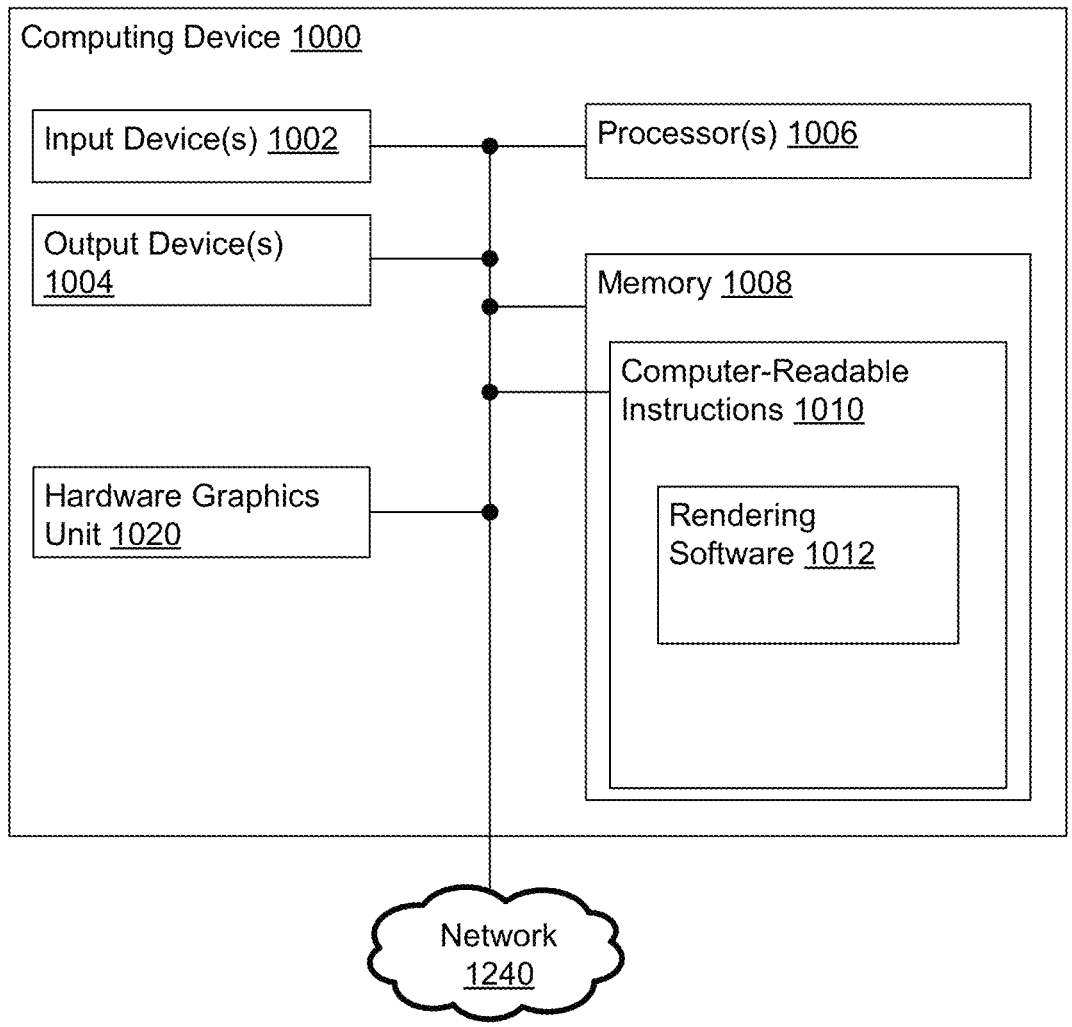
FIG. 10 is a block diagram illustrating a computing device, according to an example embodiment.

FIG. 10 is a block diagram illustrating computing device 1000, according to an example embodiment. Computing device 1000 can include one or more input devices 1002, one or more output devices 1004, one or more processors 1006, memory 1008, and hardware graphics unit 1020.

In some embodiments, computing device 1000, including hardware graphics unit 1020, can be configured to perform at least one or more herein-described functions of and/or functions related to: rendering software, a graphics hardware unit, scenario 100, methods 200, 250, 1300, a patch, a four-corner smooth shading patch, a patch region, a Bezier curve, a piecewise linear approximation, a piecewise linear approximation algorithm, a patch division algorithm, a patch division algorithm, a shape, a fundamental graphics shape, a pixel, command 500, specification 700, rendered output 710, 800, 850, 940, 990, pixel grids 900, 950, encoded input data 1110, printing devices 1210, 1212, 1214, computers 1220, 1222, server(s) 1230, and/or network 1240.

Input devices 1002 can include user input devices, network input devices, sensors, and/or other types of input devices. For example, input devices 1002 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 1240, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 1240. Sensors can include devices configured to measure conditions in an environment of computing device 1000 and provide data about that environment, such data including, but not limited to, location data, velocity (speed, direction) data, acceleration data, and other data about the environment for computing device 1000. Example sensors include, but are not limited to, GPS sensor(s), location sensors(s), gyroscope(s), accelerometer(s), magnetometer(s), camera(s), light sensor(s), infrared sensor(s), and microphone(s). Other input devices 1002 are possible as well.

Output devices 1004 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 1240, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 1240. Other types of output devices can include, but are not limited to, vibration devices, haptic feedback devices, and non-visible light emission devices; e.g., devices that emit infra-red or ultra-violet light. Other output devices 1004 are possible as well.

Processors 1006 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs)). Processors 1006 can be configured to execute computer-readable instructions 1010 that are contained in memory 1008 and/or other instructions as described herein.

Memory 1008 can include one or more computer-readable storage media configured to store data and/or instructions that can be read and/or accessed by at least one of processors 1006. The one or more computer-readable storage media can include one or more volatile and/or non-volatile storage components, such as optical, magnetic, organic or other memory or disc storage, which can be integrated in whole or in part with at least one of processors 1006. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 1008 can be implemented using a single physical device (e.g., one optical, magnetic, organic or other memory or disk storage unit), while in other embodiments, memory 1008 can be implemented using two or more physical devices.

In particular, memory 1008 can store computer-readable instructions 1010 that, when executed by processor(s) 1006, can cause a computing device to perform functions, such as but not limited to, some or all of at least the herein-described functionality of devices, networks, methods, diagrams, images, equations, and/or scenarios. In some embodiments, computer-readable instructions 1010 can include at least instructions for rendering software 1012. Rendering software 1012 can include software and/or firmware for providing graphics-related functionality; e.g., some or all of at least the functionality described herein related to rendering software, a graphics hardware unit, scenario 100, methods 200, 250, 1300, a patch, a four-corner smooth shading patch, a patch region, a Bezier curve, a piecewise linear approximation, a piecewise linear approximation algorithm, a patch division algorithm, a patch division algorithm, a shape, a fundamental graphics shape, a pixel, command 500, specification 700, rendered output 710, 800, 850, 940, 990, pixel grids 900, 950, encoded input data 1110, printing network 1200, printing devices 1210, 1212, 1214, computers 1220, 1222, server(s) 1230, and/or network 1240.

Figure 11:
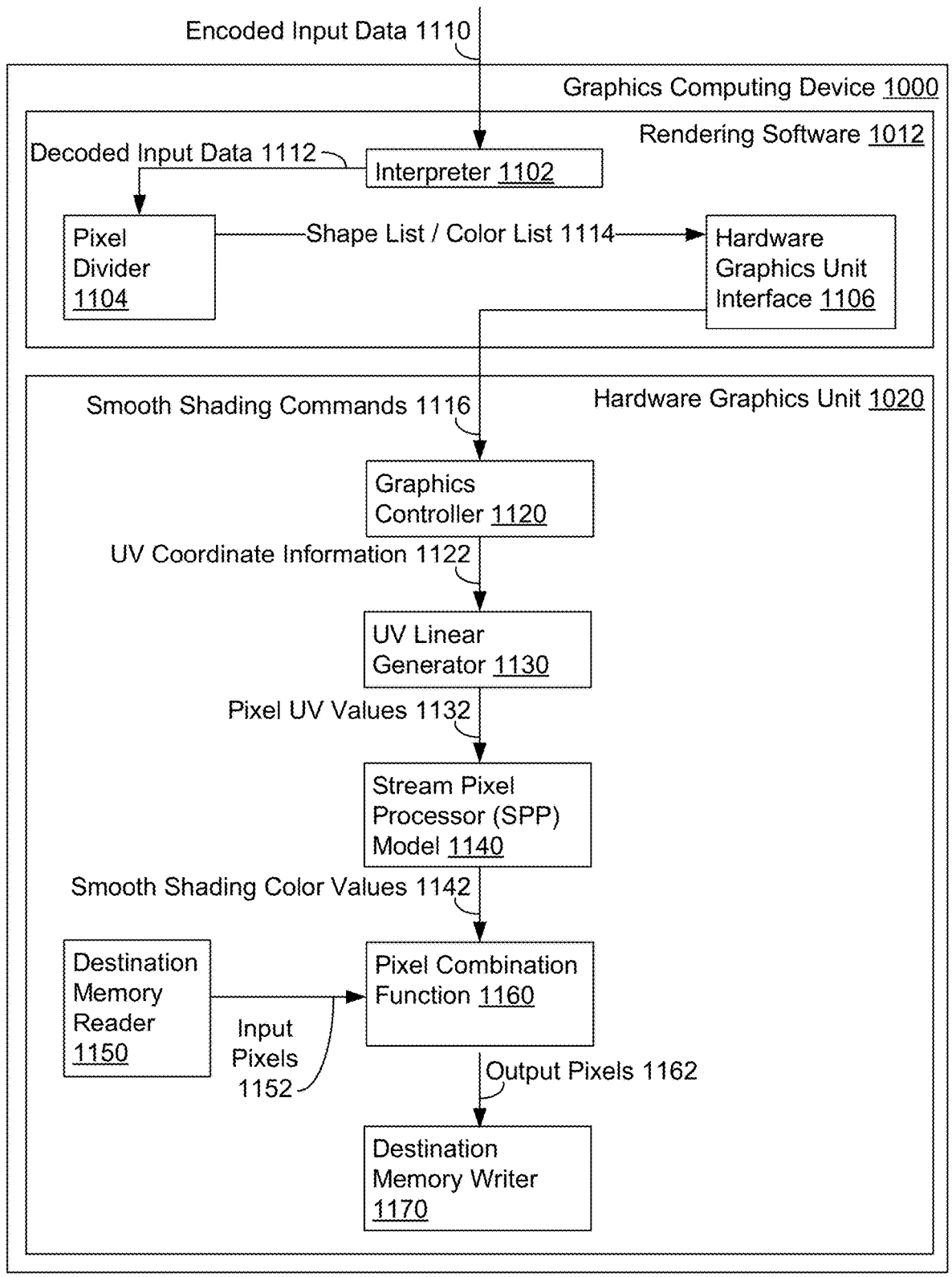
FIG. 11 shows a graphics computing device with graphics computing circuitry for smooth shading, according to an example embodiment.

FIG. 11 shows a computing device 1000 with rendering software 1012 and hardware graphics unit 1020 for smooth shading, according to an example embodiment. Rendering software 1012 can be partitioned into one or more software entities. As shown in FIG. 11, these software entities can include interpreter 1102, patch divider 1104, and hardware graphics unit interface 1106. In other examples, rendering software 1012 can include more, fewer, and/or different software entities than shown in FIG. 11.

Interpreter 1102 can receive encoded and/or compressed input data 1110 related to one or more patches and decode and/or decompress the encoded and/or compressed data to generate decoded and/or decompressed input data 1112. For example, interpreter 1102 can receive encoded and/or compressed input data received in one or more files and/or streams, where the encoded and/or compressed input data specifies patch data in terms of a page definition language.

Interpreter 1102 can decode and/or decompress the received data based on parameters defined in a shading dictionary. The shading dictionary can specify, for each patch in the input data: a patch type of the patch (e.g., a type such as a Coons patch or tensor-product patch) and control points for the patch. In some cases, all of the patches in the input data all have the same patch type, then, the shading dictionary and/or other information present in the input data can indicate that all patches in the input data have the same patch type, and per-patch patch type data may not be represented in the shading dictionary. In the context of method 200, the interpreter can be used to perform the procedures of block 210.

Interpreter 1102 can perform at least the following processes; e.g., while operating on the input data:
  Pattern and command-line operator handling;
  Initialization of a graphics state, such determining a color space from the input data; and
  Output decoded and/or decompressed input data 1112 by decoding/decompressing the input data and generating one data element per one shading object representing a patch. A shading object can include:
    four corner colors for the shading object/patch,
    control points for the shading object/patch, and
    other data for the for the shading object/patch; e.g., a shared edge flag indicating whether a edge of the shading object/patch is shared with another shading object/patch.

Patch divider 1104 can utilize the herein-described piecewise linear approximation and patch division algorithms to divide patches provided as decoded and/or decompressed input data 1112 of interpreter 1102 into shapes. In the context of method 200, patch divider 1104 can be used to perform the procedures of block 220, including the procedures of related method 250.

Patch divider 1104 can perform at least the following processes:
  Receive decoded and/or decompressed input data 1112 from interpreter 1102;
  Transform input control points, if necessary; and
  Calculate division numbers per patch by:
  Execute the herein-described piecewise linear approximation algorithm to find piecewise linear approximations of edge curves bounding in a patch, and
  Calculate the division number for the patch based on the number of line segments in the piecewise linear approximations of the edge curves.
  Execute the herein-described patch division algorithm to divide patches into fundamental graphics shapes and determine corresponding u and v coordinates for corner points of the fundamental graphics shapes; and
  Generate shape list/color list 1114 as output. Shape list/color list 1114 can include shape lists and color lists, where shape lists and color lists may be as described in at least in the context of FIG. 5. In some examples, some or all of shapes in the shape lists can be generated according to the herein-described pixel placement rule. In some examples, shape lists and/or color lists can be implemented using one or more linked lists or similar data structures.

Hardware graphics unit interface 1106 can ready shape list/color list 1114 generated by patch divider 1104 for use by hardware graphics unit 1020. Hardware graphics unit interface 1106 can parse shape list/color list 1114 generated by the patch divider to calculate the actual sizes of a shape list and a color list provided to the hardware graphics unit. Then, hardware graphics unit interface 1106 can use the actual sizes to allocate memory for the shape list and the color list. Also, hardware graphics unit interface 1106 can convert shape list/color list 1114 into one or more commands, shown as smooth shading commands 1116 in FIG. 11, for use by hardware graphics unit 1020. An example command to hardware graphics unit 1020 is shown as command 500 of FIG. 5. As such, rendering software 1012 can output smooth shading commands 1116 to hardware graphics unit 1020, where smooth shading commands 1116 can reference one or more shape lists and color lists, such as discussed above in the context of FIG. 5.

In some examples, smooth shading commands 1116 can also include some or the data in shape list/color list 1114 and/or additional data; e.g., drawing and/or command ordering data. In some examples, shape list/color list 1114 can include a shading companion table generated for each band for the input. If necessary, hardware graphics unit interface 1106 can convert colors in the color list from a color model used by the rendering software to a color model used by the hardware graphics unit. In some examples, hardware graphics unit interface 1106 can divide a trapezoid into a rectangle and one or more triangles.

Hardware graphics unit 1020 can process graphics orders, such as smooth shading commands 1116. When hardware graphics unit 1020 detects a shape list (or a color list) graphic order related to smooth shading (e.g., as part of smooth shading commands 1116), hardware graphics unit 1020 can start memory access operations to read one or more shape lists and/or color lists from memory.

Then, for each fundamental graphics shape in the shape list(s), hardware graphics unit 1020 can process the fundamental graphics shape one scan line at a time. On a per-scan-line basis, hardware graphics unit 1020 can calculate initial and final u and v coordinate values, calculate scan line length, and increment and/or decrement values associated with u and v axes. Then, hardware graphics unit 1020 can determine u and v coordinate values for each pixel in a scan line, and use Equation (4) to determine a smooth shading color for each pixel in the scan line. The smooth shading colors can be used to write output pixels representing a rendered object.

Hardware graphics unit 1020 can include one or more hardware modules. As shown in FIG. 11, these modules can include graphics controller 1120, UV linear generator 1130, stream pixel processor (SPP) model 1140, destination memory reader 1150, pixel combination function 1160, and destination memory writer 1170. In other examples, hardware graphics unit 1020 can include more, fewer, and/or different hardware modules than shown in FIG. 11.

Graphics controller 1120 can receive smooth shading commands 1116 and parse one or more shape lists and/or color lists associated with smooth shading commands 1116 to generate UV coordinate information 1122. To generate UV coordinate information 1122, graphics controller 1120 can calculate for each scan line: initial and final u and v coordinate values $(u_0, v_0)$ and $(u_1, v_1)$, scan line length, and increment and/or decrement values associated with the u and v axes. Then, graphics controller 1120 can provide UV coordinate information 1122 to UV linear generator 1130.

UV linear generator 1130 can generate per-pixel u and v coordinate values for pixels in one or more scan lines based on initial u and v coordinate values and increment and/or decrement values for the scan line(s) provided in UV coordinate information 1122. Then, UV linear generator 1130 can provide the per-pixel u and v coordinate values as pixel UV values 1132 to stream pixel processor model 1140.

Stream pixel processor model 1140 can receive pixel UV values 1132 and calculate associated smooth shading per-pixel color values for one or more pixels in one or more scan lines; e.g., using linear and/or bi-linear interpolation based on Equation (4). Stream pixel processor model 1140 can provide the smooth shading per-pixel color values as smooth shading color values 1142 to pixel combination function 1160.

Destination memory reader 1150 can be used to fetch pixel data from memory, shown in FIG. 11, as input pixels 1152 as needed; e.g., for shading or color blending. Then, destination memory reader 1150 can provide the fetch destination data as input pixels 1152 to pixel combination function 1160.

Pixel combination function 1160 can be used to combine colors from smooth shading color values 1142 with input pixels to generate output colored pixels, shown in FIG. 11 as output pixels 1162. Output pixels 1162 are then provided to destination memory writer 1170 for writing to memory as pixel data. In some examples, output pixels 1162 can replace input pixels 1152 in memory. In some examples, output pixels 1162 can be provided or otherwise used as imagery; e.g., output pixels 1162 can represent at least part of a rendered image that is based on rendering the one or more patches received as encoded input data 1110.

Figure 12:
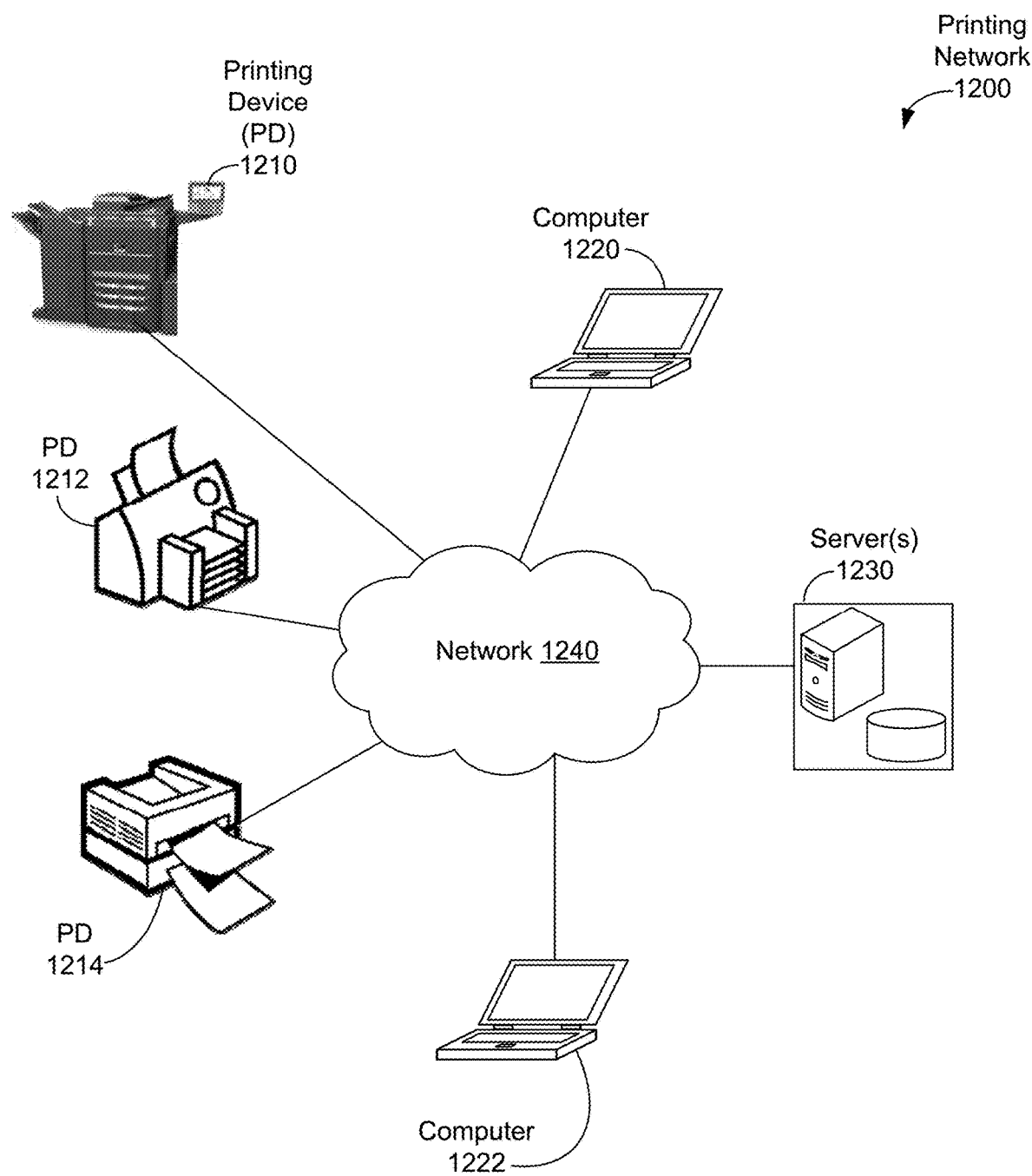
FIG. 12 is a diagram of a printing network, according to an example embodiment.

FIG. 12 is a diagram illustrating printing network 1200, according to an example embodiment. Printing network 1200 includes printing devices (PDs) 1210, 1212, 1214, computers 1220, 1222, and one or more servers 1230, all interconnected using network 1240. In some examples, printing network 1200 can have more, fewer, and/or different types of computing devices, servers, and/or printing devices than indicated in FIG. 12.

Printing devices 1210, 1212, 1214 can include devices configured to scan, print, copy, e-mail, account for, communicate, render, and/or otherwise process documents, images, and/or files that are originally available either on paper or electronically. After processing by one or more of printing devices 1210, 1212, 1214, the documents and/or files can be subsequently available either on paper or electronically, as requested. That is, printing devices 1210, 1212, 1214 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 1210, 1212, 1214 to use/access ED and/or ED1, communicate the contents of ED and/or ED1 to/from another device, and/or render at least part of one or more images; e.g., image(s) associated with at least a paper document and/or an electronic document.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 1210, 1212, 1214 can perform other tasks and/or other processing as well. Printing devices 1210, 1212, 1214 can include products from various manufacturers with variations in color, speed, computing power, functionality, network connectivity, and/or other features.

In an example embodiment, some or all printing devices 1210, 1212, 1214 can be connected to network 1240 through one or more, possibly different, network protocols. Data can be transmitted between printing devices 1210, 1212, 1214, computers 1220, 1222, and server(s) 1230 over wired and/or wireless links between computers, computing devices, printing devices, servers and network 1240. The format of each respective data transmission between devices in printing network 1200 can include one or more of a variety of different formats including: text formats, image formats, extensible mark-up language (XML), Simple Network Maintenance Protocol (SNMP) formats, database tables, a flat file format, a format associated with a page definition language, or another format.

Communications between the computers, computing devices, servers, and printing devices can include: computers 1220, 1222, and/or server(s) 1230 sending data for print jobs and/or print job portions for printing to printing devices 1210, 1212, 1214 and printing devices 1210, 1212, 1214 sending alert, status, error, device information, colorant-usage information, maintenance-event information, and/or other messages to computers 1220, 1222, and/or server(s) 1230 to inform other devices about colorant-usage, maintenance, error, and/or other conditions of the printing devices; e.g., idle, printing, sleeping, paper jam, low or out of paper, low or out of toner/ink, etc. Other communications between computers 1220, 1222, and/or server(s) 1230 are possible as well, such as, but not limited to, requests to render images using radial gradient coloring and related responses to the requests, are possible as well.

Computers 1220, 1222 can create, obtain, update, display, and/or delete data (and perhaps related software) for configurations of printing network 1200. Example data for configurations of printing network 1200, includes, but is not limited to: data for configuring devices in printing network 1200; e.g., data for printing devices 1210, 1212, 1214, data for configuring network protocols (e.g., FTP, HTTP, JMS, KPDL, PCT, PDF, SOAP, SMS, SMTP, SNMP, TCP/IP, UDP, LDAP, MQ, and/or other protocols), access-management related data for clients and/or servers; (e.g., passwords, signatures, credentials, certificates, subscriptions, licenses, and/or tokens related to accessing part or all of the functionality of network 1240 and/or cloud-based services, software and/or solutions) and data for customizing, configuring and managing applications on devices/servers of printing network 1200. In particular, computers 1220, 1222 can provide displays related to maintaining printing devices, including displays related to colorant usage for printing devices and/or predictions related to colorant usage, where the printing devices can include but are not limited to printing devices 1210, 1212, 1214.

In some examples, server(s) 1230 can store, update, delete, retrieve, and provide functionality for learning patterns, trends, and/or features about data related to printing network 1200, particularly related to printing devices, such as printing devices 1210, 1212, 1214. Based on the learned patterns, trends, and/or features, machine learning server(s) 1230 can generate outputs, such as predictions about the printing devices including but not limited to predictions of colorant usage by the printing devices. The data stored on server(s) 1230 can include device information, colorant-usage information, maintenance-event information, and/or other information related to devices related to printing network 1200. The stored data can be retrieved from server(s) 1230 in response to a received query (or queries) requesting information about specific device(s), colorant usage, maintenance events, and/or other information.

In some examples, server(s) 1230 can provide additional services as well (or instead), such as services related to some or all of the functionality for one or more document solutions and managed print services; e.g., functionality for accounting and maintenance of solutions and services, functionality for document workflows, such as processing forms, hard-copy signatures, client authentication/access functions, user interface functionality, local and/or remote network based storage management involving devices in printing network 1200. For example, server(s) 1230 additionally can provide functionality related to a print server. A print server can process jobs (e.g., spool job-related data, route jobs, provide user and/or server-related accounting for jobs, verify/enforce authentication and authorization rules related to jobs) and store data related to printing devices of printing network 1200. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing devices 1210, 1212, 1214 (and/or other devices). The data can include data used in processing jobs (e.g., spooled data for print jobs, files for file-related requests, etc.), access-management related data, primary identification characteristics and/or model-dependent information about printing devices served by server(s) 1230 and perhaps other data.

Example Methods of Operation

Figure 13:
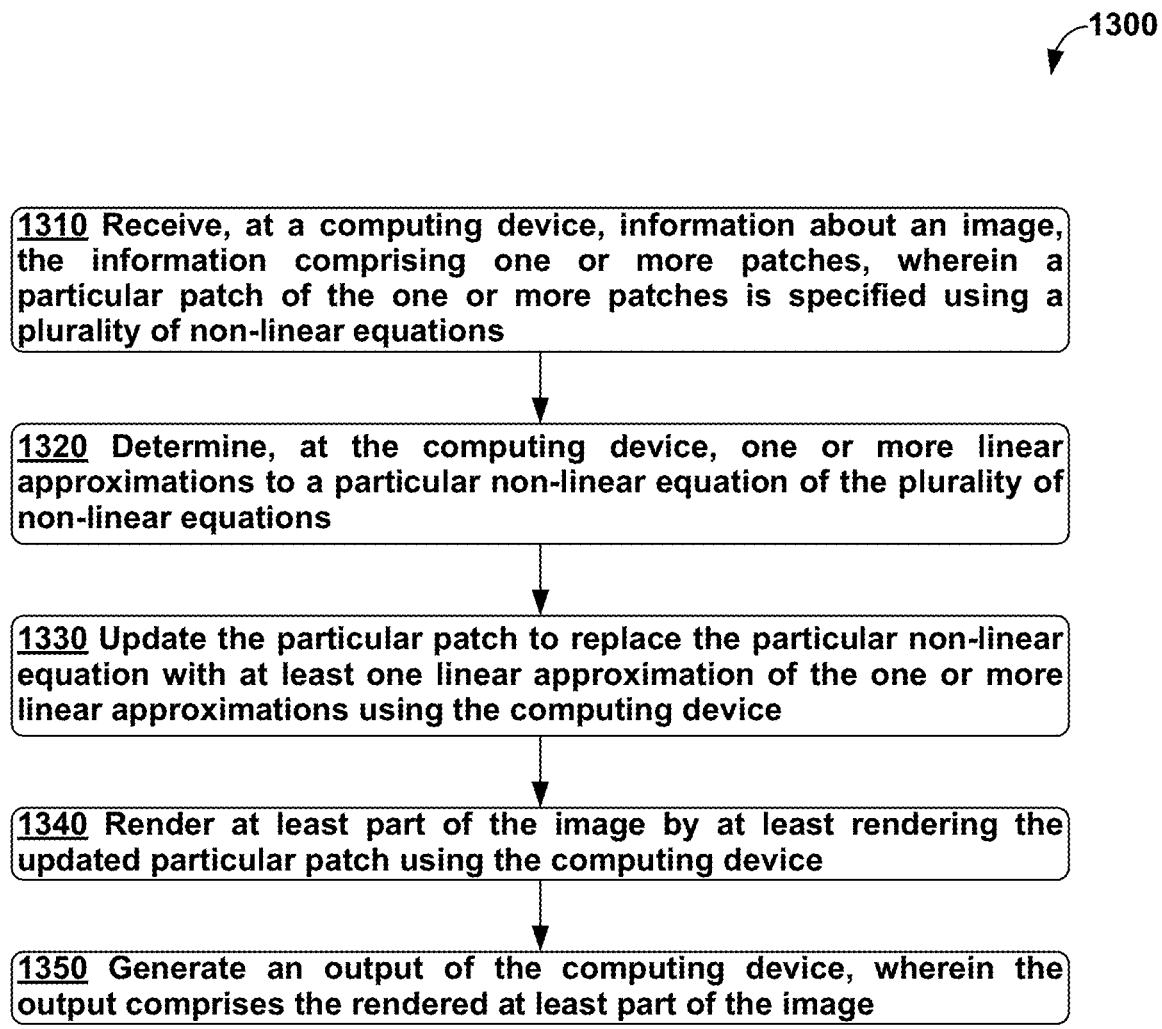
FIG. 13 shows a flowchart for a method, according to an example embodiment.

FIG. 13 shows a flowchart for a method 1300, according to an example embodiment. Method 1300 can be carried out by a computing device, such as computing device 1000 that can include hardware graphics unit 1020 and/or rendering software 1012. In other examples, some or all of the functionality of hardware graphics unit 1020 can be performed using software; e.g., rendering software 1012.

FIG. 13 shows that method 1300 can begin at block 1310, where the computing device can receive information about an image, the information including one or more patches, where a particular patch of the one or more patches is specified using a plurality of non-linear equations, such as discussed above at least in the context of FIGS. 1, 2A, and 2B.

In some examples, the particular patch can include a tensor-product patch and/or a Coons patch, such as discussed above at least in the context of FIGS. 1, 2A, and 2B. In other examples, the plurality of non-linear equations can include a cubic equation, such as discussed above at least in the context of FIGS. 1, 2A, and 2B.

At block 1320, the computing device can determine one or more linear approximations to a particular non-linear equation of the plurality of non-linear equations, such as discussed above at least in the in the context of FIGS. 1, 2A, and 2B.

In some examples, the particular non-linear equation can be associated with a plurality of control points; then, determining the one or more linear approximations to the particular non-linear equation of the plurality of non-linear equations can include determining a midpoint of a pair of the plurality of control points, such as discussed above at least in the in the context of FIGS. 1, 2A, and B. In some of these examples, determining the one or more linear approximations to the particular non-linear equation can include: determining a flatness value for a first linear approximation of the one or more linear approximations, where the flatness value for the first linear approximation is based on maximum difference between the first linear approximation and a line between a start point of the particular non-linear equation and an end point of the particular non-linear equation; determining whether the flatness value is more than a threshold flatness value; and after determining that the flatness value is more than the threshold flatness value, determining a second linear approximation that is based on the first linear approximation, such as discussed above at least in the in the context of FIGS. 1, 2A, and 2B.

At block 1330, the computing device can update the particular patch to replace the particular non-linear equation with at least one linear approximation of the one or more linear approximations, such as discussed above at least in the in the context of FIGS. 1, 2A, 2B, and 3.

At block 1340, the computing device can render at least part of the image by at least rendering the updated particular patch, such as discussed above at least in the in the context of FIGS. 1, 2A, 8, and 9.

In some examples, rendering the particular patch using the one or more linear approximations can include: determining one or more polygons that correspond to the particular patch, where the one or more polygons are based on the at least one linear approximation, determining one or more pixels corresponding to the particular patch based on the one or more polygons; and determining a color for each of the one or more pixels for the particular patch, such as discussed above at least in the in the context of FIGS. 1, 2A, 2B, 3, 4, 7A, 7B, and 9. In some of these examples, the particular patch can include two or more corner points, where each of the two or more corner points is associated with a color; then, determining a color for each of the one or more pixels can include determining the color for each of the one or more pixels based on the colors of the two or more corner points, such as discussed above at least in the in the context of FIGS. 1, 2A, 2B, 4, 7A, 7B, and 9. In other of these examples, determining the color for each of the one or more pixels based on the colors of the two or more corner points includes determining the color for a particular pixel of the one or more pixels based on a bi-linear interpolation of the colors of the two or more corner points that is associated with the particular pixel, such as discussed above at least in the in the context of FIGS. 1, 2A, 2B, 4, 7A, 7B, and 9.

At block 1350, the computing device can generate an output that includes the rendered at least part of the image, such as discussed above at least in the in the context of FIGS. 1, 2A, 7B, 8, and 9. In some examples, the output can include: a display that includes the rendered at least part of the image, a file that stores the rendered at least part of the image, and/or a paper output that includes the rendered at least part of the image, such as discussed above at least in the in the context of FIG. 2A.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
receiving, at a computing device, information about an image, the information comprising one or more patches, wherein a particular patch of the one or more patches is specified using a plurality of non-linear equations;
determining, at the computing device, one or more linear approximations to a particular non-linear equation of the plurality of non-linear equations, wherein the particular non-linear equation is associated with a plurality of control points, and wherein determining the one or more linear approximations to the particular non-linear equation of the plurality of non-linear equations comprises determining a midpoint of a pair of the plurality of control points;

updating the particular patch to replace the particular non-linear equation with at least one linear approximation of the one or more linear approximations using the computing device;

rendering at least part of the image by at least rendering the updated particular patch using the computing device; and generating an output of the computing device, wherein the output comprises the rendered at least part of the image.

2. The method of claim 1, wherein the particular patch comprises a tensor-product patch or a Coons patch.

3. The method of claim 1, wherein the plurality of non-linear equations comprise a cubic equation.

4. The method of claim 1, wherein determining the one or more linear approximations to the particular non-linear equation comprises:

determining a flatness value for a first linear approximation of the one or more linear approximations, wherein the flatness value for the first linear approximation is based on maximum difference between the first linear approximation and a line between a start point of the particular non-linear equation and an end point of the particular non-linear equation;

determining whether the flatness value is more than a threshold flatness value; and after determining that the flatness value is more than the threshold flatness value, determining a second linear approximation that is based on the first linear approximation.

5. The method of claim 1, wherein rendering the particular patch using the one or more linear approximations comprises:

determining one or more polygons that correspond to the particular patch, wherein the one or more polygons are based on the at least one linear approximation, determining one or more pixels corresponding to the particular patch based on the one or more polygons; and determining a color for each of the one or more pixels for the particular patch.

6. The method of claim 5, wherein the particular patch comprises two or more corner points, wherein each of the two or more corner points is associated with a color, and wherein determining a color for each of the one or more pixels comprises determining the color for each of the one or more pixels based on the colors of the two or more corner points.

7. The method of claim 6, wherein determining the color for each of the one or more pixels based on the colors of the two or more corner points comprises determining the color for a particular pixel of the one or more pixels based on a bi-linear interpolation of the colors of the two or more corner points that is associated with the particular pixel.

8. The method of claim 1, wherein the output comprises: a display that comprises the rendered at least part of the image, a file that stores the rendered at least part of the image, or a paper output that comprises the rendered at least part of the image.

9. A computing device, comprising:

one or more processors; and non-transitory data storage configured to store computer-readable instructions that, when executed by the one or more processors, cause the computing device to perform tasks comprising:

receiving information about an image, the information comprising one or more patches, wherein a particular patch of the one or more patches is specified using a plurality of non-linear equations;

determining one or more linear approximations to a particular non-linear equation of the plurality of non-linear equations, wherein the particular non-linear equation is associated with a plurality of control points, and wherein determining the one or more linear approximations to the particular non-linear equation of the plurality of non-linear equations comprises determining a midpoint of a pair of the plurality of control points;

updating the particular patch to replace the particular non-linear equation with at least one linear approximation of the one or more linear approximations;

rendering at least part of the image by at least rendering the updated particular patch; and generating an output that comprises the rendered at least part of the image.

10. The computing device of claim 9, wherein the particular patch comprises a tensor-product patch or a Coons patch.

11. The computing device of claim 9, wherein the plurality of non-linear equations comprises a cubic equation.

12. The computing device of claim 9, wherein determining the one or more linear approximations to the particular non-linear equation comprises:

determining a flatness value for a first linear approximation of the one or more linear approximations, wherein the flatness value for the first linear approximation is based on maximum difference between the first linear approximation and a line between a start point of the particular non-linear equation and an end point of the particular non-linear equation;

determining whether the flatness value is more than a threshold flatness value; and after determining that the flatness value is more than the threshold flatness value, determining a second linear approximation that is based on the first linear approximation.

13. The computing device of claim 9, wherein rendering the particular patch using the one or more linear approximations comprises:

determining one or more polygons that correspond to the particular patch, wherein the one or more polygons are based on the at least one linear approximation, determining one or more pixels corresponding to the particular patch based on the one or more polygons; and determining a color for each of the one or more pixels for the particular patch.

14. The computing device of claim 13, wherein the particular patch comprises two or more corner points, wherein each of the two or more corner points is associated with a color, and wherein determining a color for each of the one or more pixels comprises determining the color for each of the one or more pixels based on the colors of the two or more corner points.

15. The computing device of claim 14, wherein determining the color for each of the one or more pixels based on the colors of the two or more corner points comprises determining the color for a particular pixel of the one or more pixels based on a bi-linear interpolation of the colors of the two or more corner points that is associated with the particular pixel.

16. The computing device of claim 9, wherein the output comprises: a display that comprises the rendered at least part of the image, a file that stores the rendered at least part of the image, or a paper output that comprises the rendered at least part of the image.

17. An article of manufacture comprising non-transitory data storage storing at least computer-readable instructions that, when executed by one or more processors of a computing device, cause the computing device to perform tasks comprising:

receiving information about an image, the information comprising one or more patches, wherein a particular patch of the one or more patches is specified using a plurality of non-linear equations;

determining one or more linear approximations to a particular non-linear equation of the plurality of non-linear equations, wherein the particular non-linear equation is associated with a plurality of control points, and wherein determining the one or more linear approximations to the particular non-linear equation of the plurality of non-linear equations comprises determining a midpoint of a pair of the plurality of control points;

updating the particular patch to replace the particular non-linear equation with at least one linear approximation of the one or more linear approximations;

rendering at least part of the image by at least rendering the updated particular patch; and generating an output that comprises the rendered at least part of the image.

18. The article of manufacture of claim 17, wherein the particular patch comprises a tensor-product patch or a Coons patch.

* * * * *